US012684389B2

(12) United States Patent
Wang et al.

(10) Patent No.: US 12,684,389 B2
(45) Date of Patent: Jul. 14, 2026

(54) ACCURACY OF DIFFERENTIAL MEASUREMENT REPORTING

(71) Applicant: QUALCOMM Incorporated, San Diego, CA (US)

(72) Inventors: Hua Wang, Basking Ridge, NJ (US); Tao Luo, San Diego, CA (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 406 days.

(21) Appl. No.: 18/162,806

(22) Filed: Feb. 1, 2023

(65) Prior Publication Data

US 2024/0259850 A1     Aug. 1, 2024

(51) Int. Cl.
*H04W 24/00* (2009.01)
*H04L 5/00* (2006.01)
*H04W 24/10* (2009.01)

(52) U.S. Cl.
CPC ........... *H04W 24/10* (2013.01); *H04L 5/0048* (2013.01)

(58) Field of Classification Search
CPC .............................. H04W 24/10; H04L 5/0048
See application file for complete search history.

(56) References Cited

U.S. PATENT DOCUMENTS

| | | | | |
|---|---|---|---|---|
| 2015/0264692 A1* | 9/2015 | Liu | .................... | H04W 52/241 |
| | | | | 370/252 |
| 2018/0205480 A1* | 7/2018 | Akkarakaran | ........ | H04L 5/0073 |
| 2019/0319840 A1* | 10/2019 | Cheng | ................... | H04L 41/147 |
| 2020/0021373 A1* | 1/2020 | Cheng | .................. | H04B 17/327 |
| 2020/0229106 A1* | 7/2020 | Nguyen | .............. | H04W 52/245 |
| 2021/0195453 A1* | 6/2021 | Zhang | .................. | H04B 7/0617 |
| 2022/0187450 A1* | 6/2022 | Vollbracht | .............. | G01S 13/32 |
| 2025/0294391 A1 | 9/2025 | Wang et al. | | |

OTHER PUBLICATIONS

David R. Bull, Fan Zhang, Chapter 3 of Intelligent Image and Video Compression (Second Edition), pp. 59-105 (Year: 2021).*
Morgan Kaufmann, Chapter 9 of Introduction to Data Compression (Fifth Edition), pp. 257-298 (Year: 2018).*

* cited by examiner

*Primary Examiner* — Noel R Beharry
*Assistant Examiner* — Phillip J Kearns
(74) *Attorney, Agent, or Firm* — Holland & Hart LLP

(57) ABSTRACT

Methods, systems, and devices for wireless communications are described. A user equipment (UE) may receive a message indicating one or more measurement parameters associated with a set of reference signals. The UE may receive a first reference signal associated with a first measurement value and second reference signal associated with a second measurement value. The UE may transmit a measurement report based on the one or more reporting parameters and in accordance with a reporting option selected from a set of reporting options for the measurement report. The set of reporting options may include an absolute reporting option and a quantized reporting option. In some examples, the UE may receive a bit value indicating which reporting option to use for one or more measurement reports. In some examples, the UE may perform both reporting options and choose the reporting option associated with a lower error.

12 Claims, 18 Drawing Sheets

RRC Configuration Message 210

Reference Signals 215

Reporting Configuration Message 220

Measurement Report 235

205-a 205-b 105-a

235

220

215

210

115-a

Absolute Reporting Procedure 225

Quantized Reporting Procedure 230

200

510

520

515

505

500

130    105    115

Network
Entity

Transceiver

1210

Antenna

1215

Communications
Manager

1220

Memory

Code

1230

1225

1240

Processor

1235

1205

1200

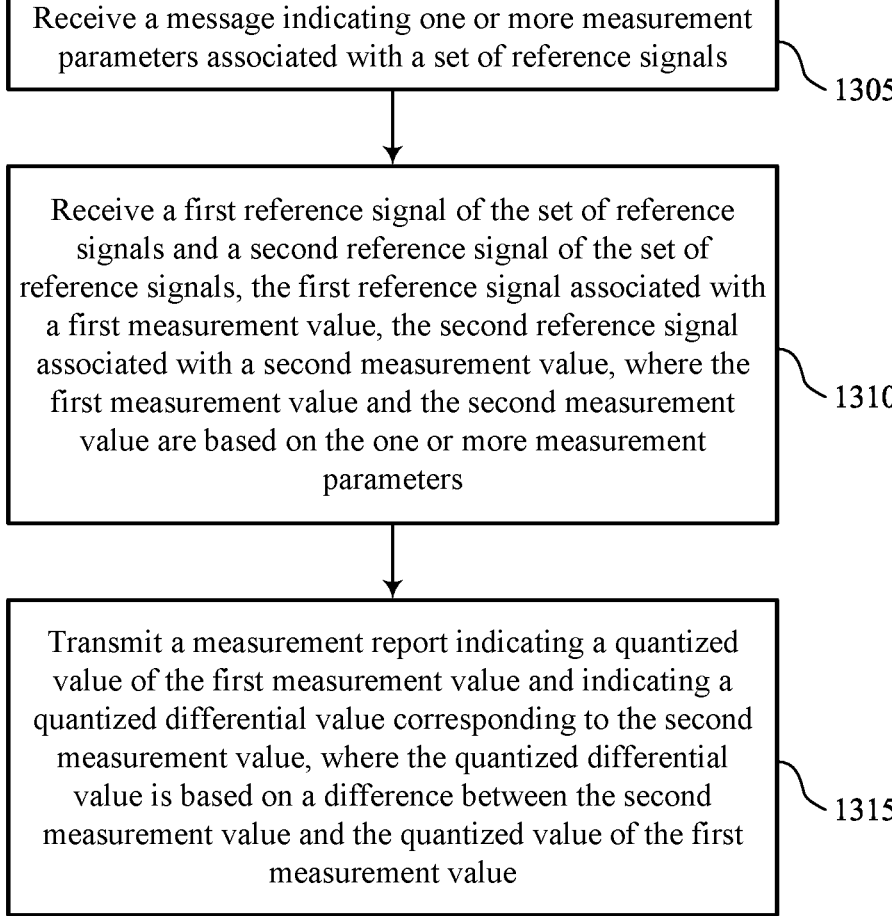

Receive a message indicating one or more measurement parameters associated with a set of reference signals

1305

Receive a first reference signal of the set of reference signals and a second reference signal of the set of reference signals, the first reference signal associated with a first measurement value, the second reference signal associated with a second measurement value, where the first measurement value and the second measurement value are based on the one or more measurement parameters

1310

Transmit a measurement report indicating a quantized value of the first measurement value and indicating a quantized differential value corresponding to the second measurement value, where the quantized differential value is based on a difference between the second measurement value and the quantized value of the first measurement value

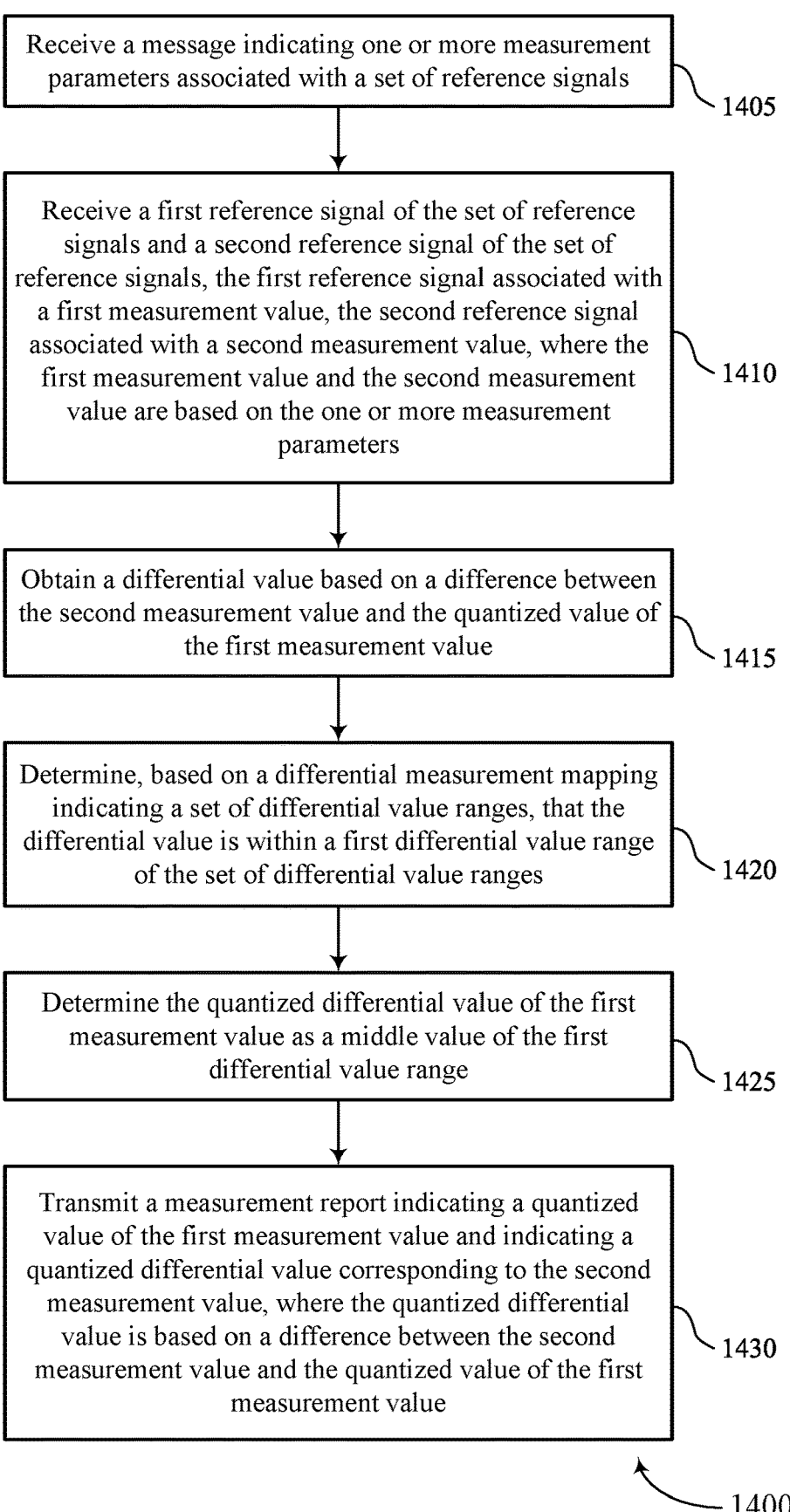

Receive a message indicating one or more measurement parameters associated with a set of reference signals

1405

Receive a first reference signal of the set of reference signals and a second reference signal of the set of reference signals, the first reference signal associated with a first measurement value, the second reference signal associated with a second measurement value, where the first measurement value and the second measurement value are based on the one or more measurement parameters

1410

Obtain a differential value based on a difference between the second measurement value and the quantized value of the first measurement value

1415

Determine, based on a differential measurement mapping indicating a set of differential value ranges, that the differential value is within a first differential value range of the set of differential value ranges

1420

Determine the quantized differential value of the first measurement value as a middle value of the first differential value range

1425

Transmit a measurement report indicating a quantized value of the first measurement value and indicating a quantized differential value corresponding to the second measurement value, where the quantized differential value is based on a difference between the second measurement value and the quantized value of the first measurement value

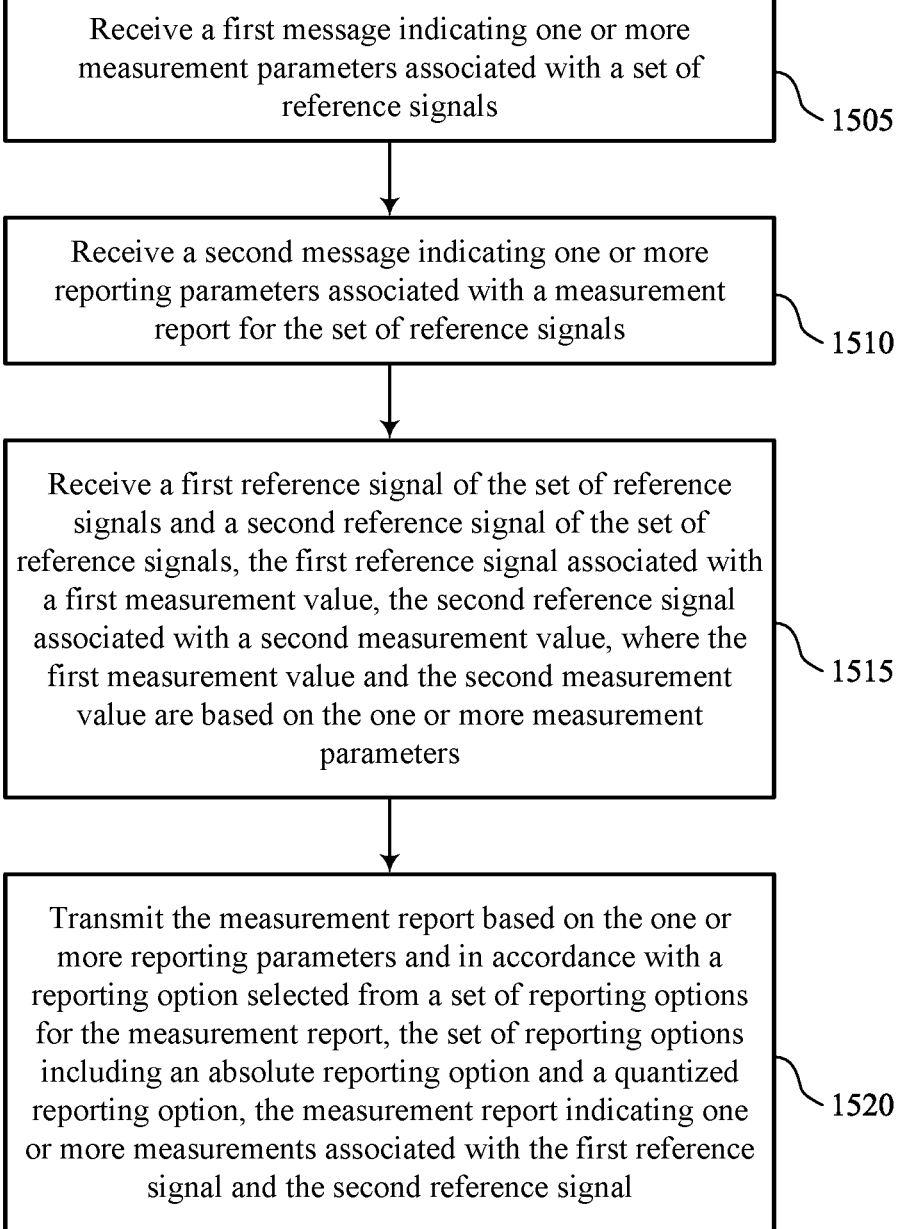

Receive a first message indicating one or more measurement parameters associated with a set of reference signals

1505

Receive a second message indicating one or more reporting parameters associated with a measurement report for the set of reference signals

1510

Receive a first reference signal of the set of reference signals and a second reference signal of the set of reference signals, the first reference signal associated with a first measurement value, the second reference signal associated with a second measurement value, where the first measurement value and the second measurement value are based on the one or more measurement parameters

1515

Transmit the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal

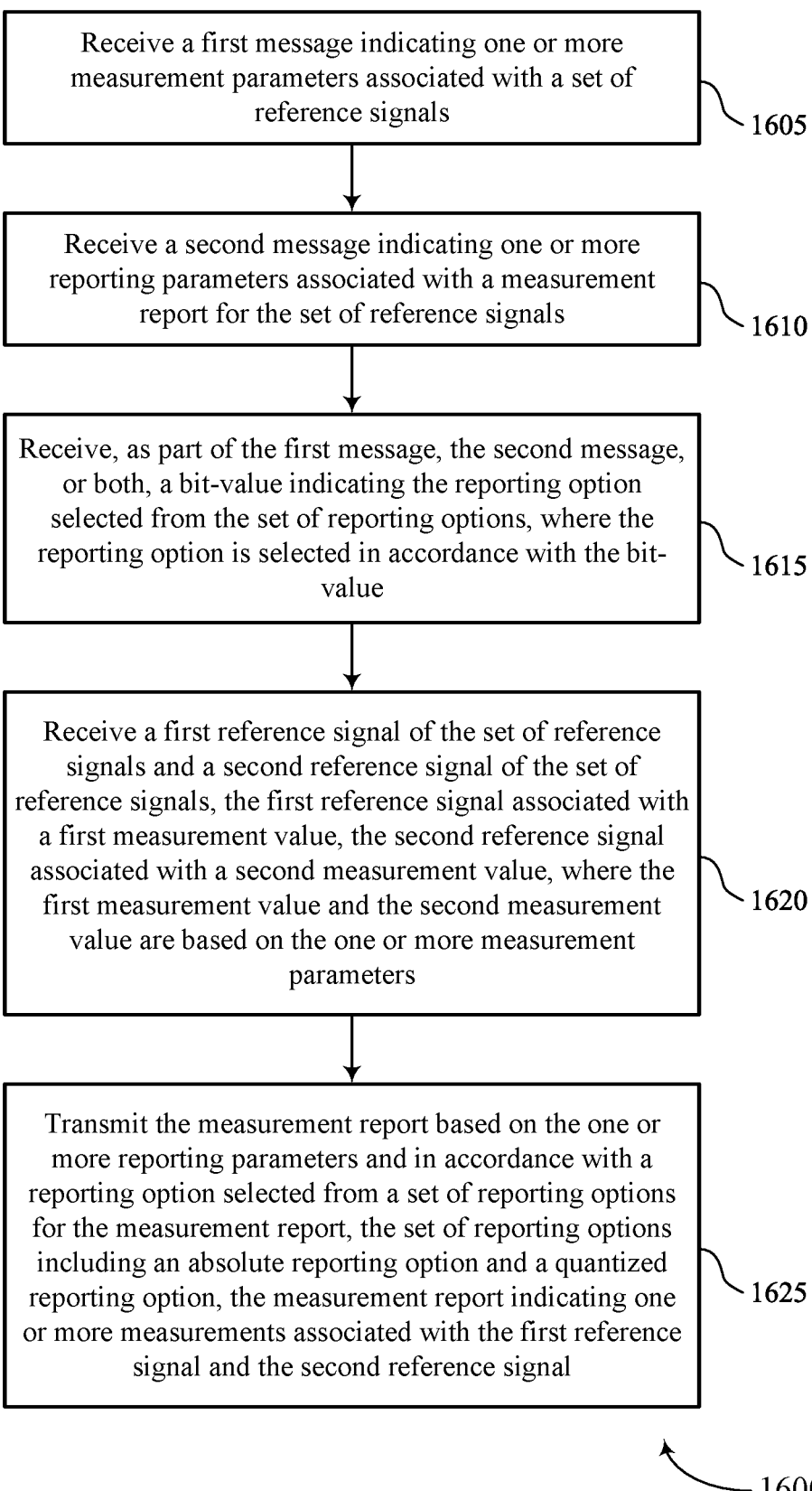

Receive a first message indicating one or more measurement parameters associated with a set of reference signals

1605

Receive a second message indicating one or more reporting parameters associated with a measurement report for the set of reference signals

1610

Receive, as part of the first message, the second message, or both, a bit-value indicating the reporting option selected from the set of reporting options, where the reporting option is selected in accordance with the bit-value

1615

Receive a first reference signal of the set of reference signals and a second reference signal of the set of reference signals, the first reference signal associated with a first measurement value, the second reference signal associated with a second measurement value, where the first measurement value and the second measurement value are based on the one or more measurement parameters

1620

Transmit the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal

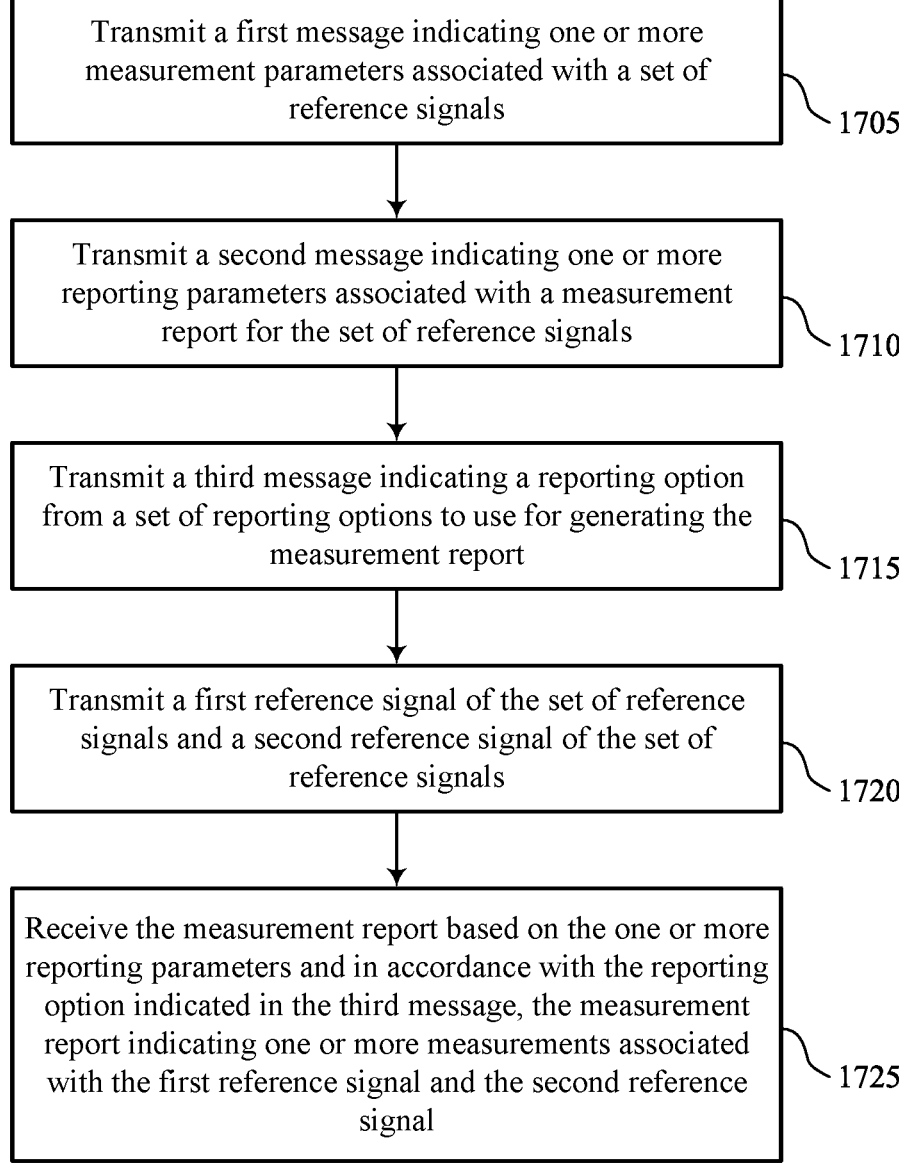

Transmit a first message indicating one or more measurement parameters associated with a set of reference signals ⟍ 1705

Transmit a second message indicating one or more reporting parameters associated with a measurement report for the set of reference signals ⟍ 1710

Transmit a third message indicating a reporting option from a set of reporting options to use for generating the measurement report ⟍ 1715

Transmit a first reference signal of the set of reference signals and a second reference signal of the set of reference signals ⟍ 1720

Receive the measurement report based on the one or more reporting parameters and in accordance with the reporting option indicated in the third message, the measurement report indicating one or more measurements associated with the first reference signal and the second reference signal ⟍ 1725

ACCURACY OF DIFFERENTIAL MEASUREMENT REPORTING

FIELD OF TECHNOLOGY

The following relates to wireless communications, including improving accuracy of differential measurement reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support improving accuracy of differential measurement reporting. For example, the described techniques enable or result in reduced errors for obtaining reference signal measurements (e.g., at a network entity). For example, a user equipment (UE) may receive a first reference signal associated with a first measurement value and a second reference signal associated with a second reference value, and may generate a differential measurement value in accordance with a quantized reporting option. For example, instead of generating an absolute difference between the first measurement value and the second measurement value, the UE may generate the difference between a quantized value of the first measurement value and the absolute value of the second measurement. In some examples, the UE may calculate the quantized value of the first measurement value by using the middle point of a measurement range that is associated with the first measurement value. Using the quantized value when calculating the differential measurement value may reduce the error in a quantized measurement estimation for the first measurement value (e.g., as performed by a network entity).

In some examples, the UE may transmit the measurement report using an absolute reporting procedure or the quantized reporting procedure. For example, the network entity may transmit a bit-value indicating which reporting procedure to use for a measurement report, and the UE may transmit the measurement report accordingly. Additionally, or alternatively, the UE may perform both reporting procedures, and choose the reporting procedure that has a lower associated error. In such examples, the UE may include a bit-value in the measurement report indicating which reporting procedure the UE used.

A method for wireless communications is described. The method may include receiving a message indicating one or more measurement parameters associated with a set of reference signals, receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters, and transmitting a measurement report indicating a quantized value of the first measurement value and indicating a quantized differential value corresponding to the second measurement value, where the quantized differential value is based on a difference between the second measurement value and the quantized value of the first measurement value.

An apparatus for wireless communications is described. The apparatus may include a processor, memory coupled with the processor, and instructions stored in the memory. The instructions may be executable by the processor to cause the apparatus to receive a message indicating one or more measurement parameters associated with a set of reference signals, receive a first reference signal of the set of reference signals and a second reference signal of the set of reference signals, the first reference signal associated with a first measurement value, the second reference signal associated with a second measurement value, where the first measurement value and the second measurement value are based on the one or more measurement parameters, and transmit a measurement report indicating a quantized value of the first measurement value and indicating a quantized differential value corresponding to the second measurement value, where the quantized differential value is based on a difference between the second measurement value and the quantized value of the first measurement value.

Another apparatus for wireless communications is described. The apparatus may include means for receiving a message indicating one or more measurement parameters associated with a set of reference signals, means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters, and means for transmitting a measurement report indicating a quantized value of the first measurement value and indicating a quantized differential value corresponding to the second measurement value, where the quantized differential value is based on a difference between the second measurement value and the quantized value of the first measurement value.

A non-transitory computer-readable medium storing code for wireless communications is described. The code may include instructions executable by a processor to receive a message indicating one or more measurement parameters associated with a set of reference signals, receive a first reference signal of the set of reference signals and a second reference signal of the set of reference signals, the first reference signal associated with a first measurement value, the second reference signal associated with a second measurement value, where the first measurement value and the second measurement value are based on the one or more measurement parameters, and transmit a measurement report indicating a quantized value of the first measurement value and indicating a quantized differential value corresponding to the second measurement value, where the quantized differential value is based on a difference between the second measurement value and the quantized value of the first measurement value.

Some examples of the method, apparatuses, and non-transitory computer-readable medium described herein may further include operations, features, means, or instructions for receiving, at a first frequency via a first cell, the first reference signal of the set of reference signals and receiving, at the first frequency via a second cell different from the first cell, the second reference signal of the set of reference signals.

Some examples of the method, apparatuses, and non-transitory computer-readable medium described herein may further include operations, features, means, or instructions for receiving, via a first cell at a first frequency, the first reference signal of the set of reference signals and receiving, via the first cell at a second frequency different than the first frequency, the second reference signal of the set of reference signals.

Some examples of the method, apparatuses, and non-transitory computer-readable medium described herein may further include operations, features, means, or instructions for determining, based on a measurement mapping indicating a set of measurement value ranges, that the first measurement value may be within a first measurement value range of the set of measurement value ranges and determining the quantized value of the first measurement value as a middle value of the first measurement value range.

Some examples of the method, apparatuses, and non-transitory computer-readable medium described herein may further include operations, features, means, or instructions for obtaining a differential value based on a difference between the second measurement value and the quantized value of the first measurement value, determining, based on a differential measurement mapping indicating a set of differential value ranges, that the differential value may be within a first differential value range of the set of differential value ranges, and determining the quantized differential value of the first measurement value as a middle value of the first differential value range.

Some examples of the method, apparatuses, and non-transitory computer-readable medium described herein may further include operations, features, means, or instructions for determining that the first measurement value may be outside a range of a set of measurement value ranges included in a measurement mapping and generating one or more additional measurement value ranges for the measurement mapping, where the first measurement value may be within an additional measurement value range of the one or more additional measurement value ranges.

Some examples of the method, apparatuses, and non-transitory computer-readable medium described herein may further include operations, features, means, or instructions for receiving, via radio resource control signaling, the message indicating the one or more measurement parameters as part of a radio resource control configuration.

In some examples of the method, apparatuses, and non-transitory computer-readable medium described herein, the one or more measurement parameters include a measurement object indicating time and frequency resources associated with the set of reference signals, a measurement report configuration indicating one or more reporting parameters associated with generating the measurement report, a measurement identity that links the measurement object to the measurement report configuration, one or more layer 3 parameters, or any combination thereof.

In some examples of the method, apparatuses, and non-transitory computer-readable medium described herein, the first measurement value and the second measurement value may be both reference signal received power (RSRP) values or both signal to interference and noise ratio (SINR) values based on the one or more measurement parameters.

Some examples of the method, apparatuses, and non-transitory computer-readable medium described herein may further include operations, features, means, or instructions for receiving, a bit-value indicating a reporting option from a set of reporting options, where transmitting the measurement report indicating the quantized value of the first measurement value and indicating the quantized differential value may be based on receiving the bit-value.

A method for wireless communications is described. The method may include receiving a first message indicating one or more measurement parameters associated with a set of reference signals, receiving a second message indicating one or more reporting parameters associated with a measurement report for the set of reference signals, receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters, and transmitting the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal.

An apparatus for wireless communications is described. The apparatus may include a processor, memory coupled with the processor, and instructions stored in the memory. The instructions may be executable by the processor to cause the apparatus to receive a first message indicating one or more measurement parameters associated with a set of reference signals, receive a second message indicating one or more reporting parameters associated with a measurement report for the set of reference signals, receive a first reference signal of the set of reference signals and a second reference signal of the set of reference signals, the first reference signal associated with a first measurement value, the second reference signal associated with a second measurement value, where the first measurement value and the second measurement value are based on the one or more measurement parameters, and transmit the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal.

Another apparatus for wireless communications is described. The apparatus may include means for receiving a first message indicating one or more measurement parameters associated with a set of reference signals, means for receiving a second message indicating one or more reporting parameters associated with a measurement report for the set of reference signals, means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters, and means for transmitting the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal.

A non-transitory computer-readable medium storing code for wireless communications is described. The code may include instructions executable by a processor to receive a first message indicating one or more measurement parameters associated with a set of reference signals, receive a second message indicating one or more reporting parameters associated with a measurement report for the set of reference signals, receive a first reference signal of the set of reference signals and a second reference signal of the set of reference signals, the first reference signal associated with a first measurement value, the second reference signal associated with a second measurement value, where the first measurement value and the second measurement value are based on the one or more measurement parameters, and transmit the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal.

Some examples of the method, apparatuses, and non-transitory computer-readable medium described herein may further include operations, features, means, or instructions for receiving, as part of the first message, the second message, or both, a bit-value indicating the reporting option selected from the set of reporting options, where the reporting option may be selected in accordance with the bit-value.

Some examples of the method, apparatuses, and non-transitory computer-readable medium described herein may further include operations, features, means, or instructions for transmitting, as part of the measurement report, a bit-value indicating the reporting option selected from a set of reporting options.

Some examples of the method, apparatuses, and non-transitory computer-readable medium described herein may further include operations, features, means, or instructions for determining, using the absolute reporting option, a first measurement associated with the first reference signal and the second reference signal, the first measurement having a first error and determining, using the quantized reporting option, a second measurement associated with the first reference signal and the second reference signal, the second measurement having a second error, where the reporting option selected may be based on which of the first error and the second error may be lower.

In some examples of the method, apparatuses, and non-transitory computer-readable medium described herein, the absolute reporting option may include operations, features, means, or instructions for obtaining a differential value using a difference between the second measurement value and the first measurement value, determining, based on a differential measurement mapping indicating a set of differential value ranges, that the differential value may be within a first differential value range of the set of differential value ranges, and determining a middle value of the first differential value range.

In some examples of the method, apparatuses, and non-transitory computer-readable medium described herein, the quantized reporting option may include operations, features, means, or instructions for determining, based on a measurement mapping indicating a set of measurement value ranges, that the first measurement value may be within a first measurement value range of the set of measurement value ranges, determining a quantized value of the first measurement value as a middle value of the first measurement value range, measuring a differential value using a difference between the second measurement value and the quantized value of the first measurement value, determining, based on a differential measurement mapping indicating a set of differential value ranges, that the differential value may be within a first differential value range of the set of differential value ranges, and determining a quantized differential value as a middle value of the first differential value range.

A method for wireless communications is described. The method may include transmitting a first message indicating one or more measurement parameters associated with a set of reference signals, transmitting a second message indicating one or more reporting parameters associated with a measurement report for the set of reference signals, transmitting a third message indicating a reporting option from a set of reporting options to use for generating the measurement report, transmitting a first reference signal of the set of reference signals and a second reference signal of the set of reference signals, and receiving the measurement report based on the one or more reporting parameters and in accordance with the reporting option indicated in the third message, the measurement report indicating one or more measurements associated with the first reference signal and the second reference signal.

An apparatus for wireless communications is described. The apparatus may include a processor, memory coupled with the processor, and instructions stored in the memory. The instructions may be executable by the processor to cause the apparatus to transmit a first message indicating one or more measurement parameters associated with a set of reference signals, transmit a second message indicating one or more reporting parameters associated with a measurement report for the set of reference signals, transmit a third message indicating a reporting option from a set of reporting options to use for generating the measurement report, transmit a first reference signal of the set of reference signals and a second reference signal of the set of reference signals, and receive the measurement report based on the one or more reporting parameters and in accordance with the reporting option indicated in the third message, the measurement report indicating one or more measurements associated with the first reference signal and the second reference signal.

Another apparatus for wireless communications is described. The apparatus may include means for transmitting a first message indicating one or more measurement parameters associated with a set of reference signals, means for transmitting a second message indicating one or more reporting parameters associated with a measurement report for the set of reference signals, means for transmitting a third message indicating a reporting option from a set of reporting options to use for generating the measurement report, means for transmitting a first reference signal of the set of reference signals and a second reference signal of the set of reference signals, and means for receiving the measurement report based on the one or more reporting parameters and in accordance with the reporting option indicated in the third message, the measurement report indicating one or more measurements associated with the first reference signal and the second reference signal.

A non-transitory computer-readable medium storing code for wireless communications is described. The code may include instructions executable by a processor to transmit a first message indicating one or more measurement parameters associated with a set of reference signals, transmit a second message indicating one or more reporting parameters associated with a measurement report for the set of reference signals, transmit a third message indicating a reporting option from a set of reporting options to use for generating the measurement report, transmit a first reference signal of the set of reference signals and a second reference signal of the set of reference signals, and receive the measurement report based on the one or more reporting parameters and in accordance with the reporting option indicated in the third message, the measurement report indicating one or more measurements associated with the first reference signal and the second reference signal.

Some examples of the method, apparatuses, and non-transitory computer-readable medium described herein may further include operations, features, means, or instructions for transmitting, as part of the first message, the second message, or both, a bit-value indicating the reporting option from the set of reporting options.

Some examples of the method, apparatuses, and non-transitory computer-readable medium described herein may further include operations, features, means, or instructions for receiving, as part of the measurement report, a bit-value indicating the reporting option from the set of reporting options.

In some examples of the method, apparatuses, and non-transitory computer-readable medium described herein, the set of reporting options include an absolute reporting option and a quantized reporting option.

BRIEF DESCRIPTION OF THE DRAWINGS

FIGS. 13 through 18 illustrate flowcharts showing methods that support improving accuracy of differential measurement reporting in accordance with one or more aspects of the present disclosure.

DETAILED DESCRIPTION

Figure 1:
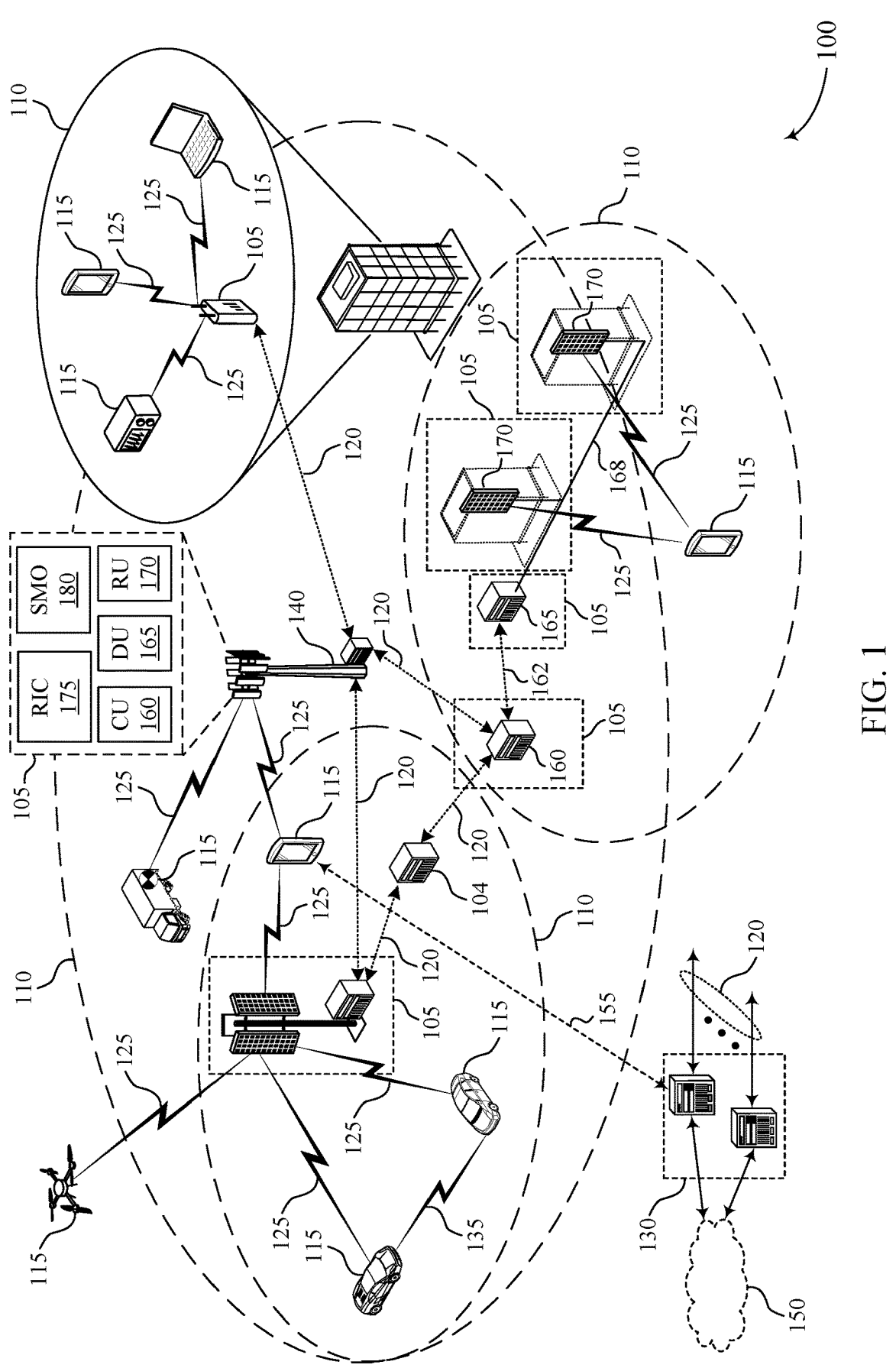
FIG. 1 illustrates an example of a wireless communications system that supports improving accuracy of differential measurement reporting in accordance with one or more aspects of the present disclosure.

In some examples, one or more wireless devices may perform and communicate measurements associated with wireless communications. For example, a user equipment (UE) may perform measurements of a reference signal (e.g., reference signal received power (RSRP) or signal to interference and noise ratio (SINR)). For example, the UE may generate a first measurement value associated with a first reference signal and generate a second measurement value of a second reference signal and in some cases, may compare the first and second measurement values. In some examples, the UE may indicate the first measurement value to a network entity using a set of bits associated with a measurement range for the first measurement value and the network entity may estimate the first measurement value as the middle of the measurement range. Further, the UE may calculate an absolute differential value between the first measurement value and the second measurement value and transmit a set of bits that indicate a differential measurement range that the absolute differential value is within, and this technique may be referred to as an absolute reporting procedure. The UE may transmit, to the network entity, a measurement report indicating the measurement range for the first measurement value and the differential measurement range, and the network entity may use the middle point of each of the ranges for obtaining, generating, or determining the values measured by the UE for the first and second reference signal. This may be referred to as a quantized measurement estimation by the network entity. However, based on the network entity performing quantized estimation for both the first measurement value and the differential measurement value, the measurement estimation may be associated with a double-quantization error, which may decrease the accuracy of the reference signal estimation (e.g., the obtained measurement of the first and second reference signals).

Techniques herein may decrease the error of reference signal estimation at the network entity. For instance, a UE may generate a differential measurement value in accordance with a quantized reporting option. That is, instead of generating the absolute difference between the first measurement value and the second measurement value, the UE may generate the difference between a quantized value of the first measurement value and the absolute value of the second measurement. In some examples, the UE may calculate the quantized value of the first measurement value by using the middle point of the measurement range associated with the first measurement value. Using the quantized value when calculating the differential measurement value may account for errors caused by the network entity performing quantized measurement estimation for the first measurement value, which may increase the accuracy of the reference signal estimation and the corresponding measurement values for the first, second, and other reference signals, if any.

In some examples, the UE may transmit the measurement report using the absolute reporting procedure or the quantized reporting procedure. For example, the network entity may transmit a bit-value indicating which reporting procedure to use for one or more measurement reports. Additionally, or alternatively, the UE may perform both reporting procedures, and choose the reporting procedure that has a lower associated error. In such examples, the UE may include a bit-value in the measurement report indicating which reporting procedure the UE used.

Aspects of the disclosure are initially described in the context of wireless communications systems and process flows. Aspects of the disclosure are further illustrated by and described with reference to apparatus diagrams, system diagrams, and flowcharts that relate to improving accuracy of differential measurement reporting.

FIG. 1 illustrates an example of a wireless communications system 100 that supports improving accuracy of differential measurement reporting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support improving accuracy of differential measurement reporting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples of wireless communications system 100, a UE 115 may perform measurements of one or more reference signals (e.g., RSRP or SINR). For example, the UE 115 may measure one or more reference signals, and may generate a first measurement value associated with a first reference signal and a second measurement value of a second reference signal. In some examples, the UE 115 may indicate the first measurement value to a network entity 105 using a set of bits associated with a measurement range for the first measurement value, and the network entity 105 may estimate the first measurement value as the middle of range. Additionally, the UE 115 may calculate an absolute differential value between the first measurement value and the second measurement value and transmit a set of bits that indicate a differential measurement range that the absolute differential value is within (e.g., an absolute reporting procedure). As such, the network entity 105 may receive the measurement range and the differential measurement range and use the middle point of each of the ranges (e.g., quantized measurement estimation). However, because the network entity 105 performs quantized estimation for both the first measurement value and the differential measurement value, but the UE 115 calculates an absolute first measurement value and absolute different value, the measurements obtained by the network entity 105 may be subject to a double-quantization error, which may decrease the accuracy of the measurement value estimation at the network entity 105.

Wireless communications system 100 supports techniques to decrease the error of reference signal estimation (e.g., the obtainment or generation of measurement values associated with respective reference signals) at the network entity 105 by the UE 115 generating a differential measurement value in accordance with a quantized reporting option. For example, instead of performing the absolute difference between the first measurement value and the second measurement value, the UE 115 may generate the difference between a quantized value of the first measurement value and the absolute value of the second measurement. In some examples, the UE 115 may calculate the quantized value of the first measurement value by using the middle point of the associated measurement range. As such, using the quantized value when calculating the differential measurement value may account for the error associated with the network entity 105 performing quantized measurement estimation for the first measurement value, which may increase the accuracy of the reference signal estimation.

In some examples, the UE 115 may determine to transmit the measurement report using the absolute reporting procedure or the quantized reporting procedure. For example, the network entity 105 may transmit a bit-value indicating which reporting procedure to use for one or more measurement reports. Additionally, or alternatively, the UE 115 may perform both reporting procedures, and choose the reporting procedure that has a lower associated error. In such examples, the UE 115 may include a bit-value in the measurement report indicating which reporting procedure the UE 115 used.

Figure 2:
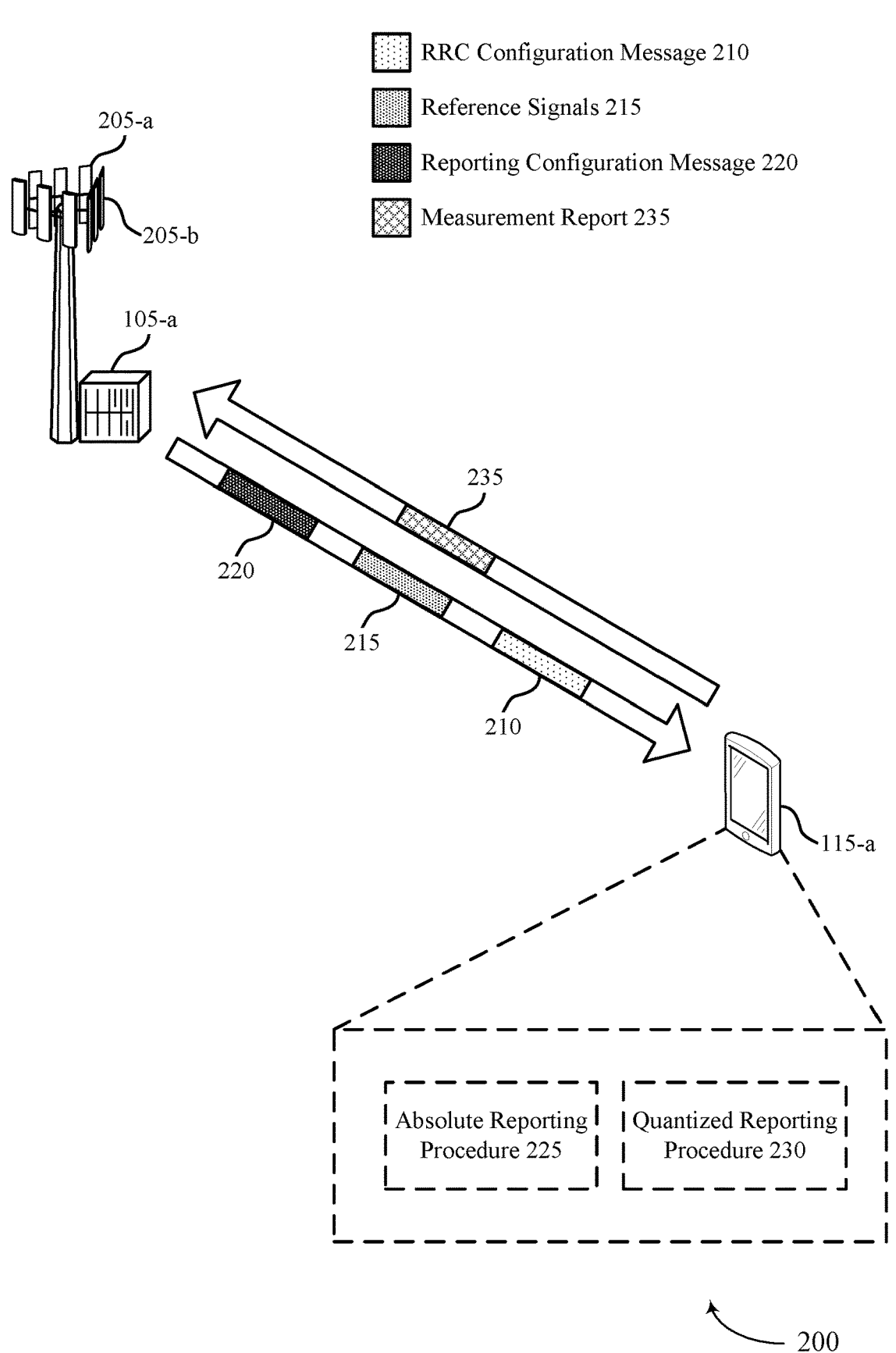
FIG. 2 illustrates an example of a wireless communications system that supports improving accuracy of differential measurement reporting in accordance with one or more aspects of the present disclosure.

FIG. 2 illustrates an example of a wireless communications system 200 that supports improving accuracy of differential measurement reporting in accordance with one or more aspects of the present disclosure. In some examples, the wireless communications system 200 may implement aspects of a wireless communications system 100. For example, the wireless communications system 200 may include a network entity 105-a and a UE 115-a, which may be respective examples of a network entity 105 and UE 115, as described with reference to FIG. 1. In some examples, the UE 115-*a* and network entity 105-*a* may perform measurement reporting for one or more reference signals 215 using one or more reporting procedures.

In some examples, the UE 115-*a* may perform measurements of a reference signal (e.g., RSRP or SINR). For example, the UE 115-*a* may measure a first value associated with a first reference signal and measure a second value of a second reference signal and compare the values. In some cases, the measurement values are indicated to the network entity 105-*a* using a set of bits. For example, the UE 115-*a* may be configured to report an RSRP value for a given reference signal in accordance with Table 1, below.

TABLE 1

| Field | Bitwidth |
|---|---|
| RSRP | 7 |
| Differential RSRP | 4 |

Using Table 1, the UE 115-*a* may report an RSRP value associated with a received reference signal using the associated bitwidth (e.g., 7 bits). As such, each value of the 7 bits may be associated with an RSRP value range that has an associated resolution (e.g., 128 RSRP value ranges expressed by the 7 bits). While Table 1 indicates that the UE 115-*a* may use 7 bits to indicate a given RSRP value range, it is understood that any quantity of bits may be used to indicate the given RSRP value range. An example of an RSRP measurement report mapping is described with reference to Table 2, below.

TABLE 2

| Reported Value | Measured Quantity Value of RSRP | Unit |
|---|---|---|
| RSRP_0 | RSRP < −156 | dB |
| RSRP_1 | −156 ≤ RSRP < −155 | dB |
| RSRP_2 | −155 ≤ RSRP < −154 | dB |
| RSRP_3 | −154 ≤ RSRP < −153 | dB |
| . . . | . . . | . . . |
| RSRP_125 | −32 ≤ RSRP < −31 | dB |
| RSRP_126 | −31 ≤ RSRP | dB |
| RSRP_127 | Infinity | dB |

In Table 2, each reported value (e.g., RSRP_0 through RSRP_127) may be associated with a resolution of 1 dB (e.g., RSRP value range). While Table 2 indicates a resolution of 1 dB for each reported value, it is understood that the resolution may be of any granularity or unit.

In accordance with Table 1, the UE 115-*a* may report a differential RSRP value associated with a difference between multiple received reference signals 215 using the associated bitwidth (e.g., 4 bits). As such, each value of the 4 bits may be associated with a differential RSRP value range that has an associated resolution (e.g., 16 differential RSRP value ranges expressed by the 4 bits). While Table 1 indicates that the UE 115-*a* may use 4 bits to indicate a given differential RSRP value range, it is understood that any quantity of bits may be used to indicate the given RSRP value range. An example of a differential RSRP measurement report mapping is described with reference to Table 3, below.

TABLE 3

| Reported Value | Measured Quantity Value of Differential RSRP | Unit |
|---|---|---|
| DIFFRSRP_0 | 0 ≥ ΔRSRP > −2 | dB |
| DIFFRSRP_1 | −2 ≥ ΔRSRP > −4 | dB |

TABLE 3-continued

| Reported Value | Measured Quantity Value of Differential RSRP | Unit |
|---|---|---|
| DIFFRSRP_2 | −6 ≥ ΔRSRP > −8 | dB |
| DIFFRSRP_3 | −8 ≥ ΔRSRP > −10 | dB |
| . . . | . . . | . . . |
| DIFFRSRP_13 | −26 ≥ ΔRSRP > −28 | dB |
| DIFFRSRP_14 | −28 ≥ ΔRSRP > −30 | dB |
| DIFFRSRP_15 | −30 ≥ ΔRSRP | dB |

In Table 3, each reported differential value (e.g., DIFFRSRP_0 through DIFFRSRP_15) may be associated with a resolution of 2 dB (e.g., differential RSRP value range). While Table 3 indicates a resolution of 2 dB for each reported differential value, it is understood that the resolution may be of any decibel granularity.

Additionally, or alternatively, the UE 115-*a* may be configured to transmit reporting associated with reporting SINR in accordance with Table 4, below.

TABLE 4

| Field | Bitwidth |
|---|---|
| SINR | 7 |
| Differential SINR | 4 |

Similar to RSRP value reporting (e.g., Table 2) and using Table 4, the UE 115-*a* may be configured to report an SINR value associated with a received reference signal using the associated bitwidth (e.g., 7 bits). In this example, each value of the 7 bits may be associated with an SINR value range that has an associated resolution (e.g., 128 SINR value ranges expressed by the 7 bits). While Table 4 indicates that the UE 115-*a* may use 7 bits to indicate a given SINR value range, it is understood that any quantity of bits may be used to indicate the given SINR value range. An example of an SINR measurement report mapping is described with reference to Table 5, below.

TABLE 5

| Reported Value | Measured Quantity Value of SINR | Unit |
|---|---|---|
| SINR_0 | SINR < −23 | dB |
| SINR_1 | −23 ≤ SINR < −22.5 | dB |
| SINR_2 | −22.5 ≤ SINR < −22 | dB |
| SINR_3 | −22 ≤ SINR < −21.5 | dB |
| . . . | . . . | . . . |
| SINR_125 | 39 ≤ SINR < 39.5 | dB |
| SINR_126 | 39.5 ≤ SINR < 40 | dB |
| SINR_127 | 40 ≤ SINR | dB |

In Table 5, each reported value (e.g., SINR_0 through SINR_127) may be associated with a resolution of 0.5 dB (e.g., SINR value range). While Table 5 indicates a resolution of 0.5 dB for each reported value, it is understood that the resolution may be of any granularity or unit.

Similar to differential RSRP value reporting (e.g., Table 3) and in accordance with Table 4, the UE 115-*a* may report a differential SINR value associated with a difference between multiple received reference signals 215 using 4 bits. As such, each value of the 4 bits may be associated with a differential SINR value range that has an associated resolution (e.g., 16 differential SINR value ranges expressed by the 4 bits). While Table 4 indicates that the UE 115-*a* may use 4 bits to indicate a given differential SINR value, it is understood that any quantity of bits may be used to indicate the given SINR value. An example of a differential SINR measurement report mapping is described with reference to Table 6, below.

TABLE 6

| Reported Value | Measured Quantity Value of Differential SINR | Unit |
|---|---|---|
| DIFFSINR_0 | 0 ≥ ΔSINR > −1 | dB |
| DIFFSINR_1 | −1 ≥ ΔSINR > −2 | dB |
| DIFFSINR_2 | −2 ≥ ΔSINR > −3 | dB |
| DIFFSINR_3 | −3 ≥ ΔSINR > −4 | dB |
| . . . | . . . | . . . |
| DIFFSINR_13 | −13 ≥ ΔSINR > −14 | dB |
| DIFFSINR_14 | −14 ≥ ΔSINR > −15 | dB |
| DIFFSINR_15 | −15 ≥ ΔSINR | dB |

In Table 6, each reported differential value (e.g., DIFFS-INR_0 through DIFFSINR_15) may be associated with a resolution of 1 dB (e.g., differential SINR value range). While Table 3 indicates a resolution of 1 dB for each reported differential value, it is understood that the resolution may be of any decibel granularity. In some examples, the values measured for one or more reference signals may not be included in the Tables 2, 3, 5, and 6. In such examples, the UE 115-a may generate one or more additional value ranges such that the measured values may be within the generated additional value ranges.

In some cases, the network entity 105-a may transmit to the UE 115-a an RRC configuration message 210 that configures the UE 115-a to perform measurements for reference signals 215 (e.g., RSRP and SINR). The RRC configuration message 210 may also instruct the UE 115-a to generate and transmit a measurement report 235 that includes the measurements of the reference signals 215. For example, the RRC configuration message 210 may include one or more measurement objects that identify time and frequency location of a physical broadcast channel (PBCH) and CSI-RS resources for the UE 115-a to measure. Additionally, or alternatively, the RRC configuration message 210 may include one or more reporting configurations that may indicate parameters associated periodic or event triggered reporting for the measurement report 235. Further, the RRC configuration message 210 may include a measurement identity that links a reporting configuration from the one or more reporting configurations to a measurement object of the one or more measurement objects. In some cases, the RRC configuration message 210 may include a quantity configuration that specifies layer 3 filtering coefficients which define the memory of the layer 3 filtering.

The network entity 105-a may transmit a set of reference signals 215 in accordance with the resources of the measurement objects indicated in the RRC configuration message 210. For example, the reference signals 215 may include a first reference signal and a second reference signal associated PBCH and CSI-RS resources indicated in a measurement object. In some cases, the network entity 105-a may transmit the first reference signal using a first cell 205 (e.g., cell 205-a) and transmit the second reference signal using a second cell 205 (e.g., cell 205-b). In such cases, a relative accuracy of RSRP or SINR may be expressed as a first RSRP or SINR value measured from a cell 205-a compared to a second RSRP or SNIR value from cell 205-b on a same frequency. In some cases, the network entity 105-a may transmit the first reference signal at a first frequency and the second reference signal at a second frequency using the same cell 205. In such cases, the relative accuracy for RSRP or SINR may be expressed as a first RSRP or SINR value measured from the cell 205 at a first frequency and a second RSRP or SINR value measured from the cell 205 at a second frequency.

The UE 115-a may transmit the measurement report 235 including the measurement information (e.g., RSRP or SINR) associated with the first reference signal and the second reference signal. In some examples, the network entity 105-a may receive a measurement value range for the first reference signal (e.g., RSRP or SINR) and estimate the measurement value as the middle of the range. For example, if the UE 115-a indicates the RSRP range of −100 dB to −99 dB, the network entity 105-a may estimate the RSRP value for the first reference signal as −99.5 dB. Additionally, or alternatively, the UE 115-a may calculate an absolute differential value between the first measurement value for the first reference signal and the second measurement value for the second reference signal. For example, if a first RSRP value for the first reference signal is −99.8 dB and a second RSRP value for the second reference signal is −103.6 dB, then the absolute differential value may be −3.8 dB (e.g., absolute reporting procedure 225). As such, the UE 115-a may report the absolute differential value range of −4 dB to −2 dB, and the network entity 105-a may determine the estimate the differential RSRP value as the middle of the range (e.g., −3 dB).

The network entity 105-a may add the estimated RSRP value (e.g., −99.5 dB) to the estimated differential RSRP value (e.g., −3 dB) to determine an estimation for the RSRP of the reference signals 215 (e.g., −102.5 dB). In some examples, however, the UE 115-a calculating the differential RSRP value in accordance with the absolute reporting procedure 225 may result in a double-quantization error at the network entity 105-a. For instance, the UE 115-a may transmit the first RSRP value of the first reference signal as an RSRP range (e.g., a first quantized error) and transmit the absolute differential RSRP value as a differential RSRP range (e.g., a second quantized error). In some cases, the double-quantization error associated with performing the absolute reporting procedure 225 may increase the error for the RSRP estimation at the network entity 105-a.

To decrease the error associated with the measurement estimation of the reference signals 215, the UE 115-a and the network entity 105-a may operate in accordance with the techniques described herein. For example, the UE 115-a may generate the differential RSRP or SINR value (e.g., between the first reference signal and the second reference signal) in accordance with a quantized reporting procedure 230. For example, the UE 115-a may calculate the differential RSRP or SINR by subtracting the middle point of the quantized range of the first reference signal with the absolute measurement of the second reference signal. For instance, in the example in which the first RSRP value for the first reference signal is −99.8 dB and the second RSRP for the second reference signal is −103.6 dB, the UE 115-a may determine the quantized value of the first RSRP value as the middle of the RSRP range of −100 dB to −99 dB (e.g., −99.5 dB). In accordance with quantized reporting procedure 230, the UE 115-a may calculate a quantized differential RSRP value by calculating the difference of the quantized value of the first RSRP (e.g., −99.5 dB) with the absolute value of the second RSRP (e.g., −103.6 dB). In such an example, the UE 115-a may determine the quantized differential RSRP value to be −4.1 dB. As such, the UE 115-a may include in the measurement report 235 the bit values associated with the RSRP value range of −100 dB to −99 dB and the bit values associated with the differential RSRP value range of −4 dB to −6 dB.

In some cases, the UE 115-a may generate the measurement report 235 in accordance with the absolute reporting procedure 225 or the quantized reporting procedure 230. As such, the UE 115-a may transmit a reporting configuration message 220 that indicates which reporting option for the UE 115-a to use. For instance, the reporting configuration message 220 may include one bit (e.g., an option bit) indicating whether the UE 115-a may use the absolute reporting procedure 225 or the quantized reporting procedure 230. In some examples, the option bit may be included in the measurement object configuration of the RRC configuration message 210. In some examples, the option bit may be included in the reporting configuration of the RRC configuration message 210. If a first option bit is configured in the measurement object configuration and a second option bit is configured in the reporting configuration linked by a measurement identity, the network entity 105-a may define which option bit has a higher priority. In some examples, the UE 115-a may choose which reporting procedure to apply to subsequent reporting messages until the network entity 105-a transmits RRC signaling reconfiguring which reporting procedure for the UE 115-a to use.

Additionally, or alternatively, the UE 115-a may add one bit to the measurement report 235 (e.g. as part of the RSRP or SINR reporting bit stream) to indicate which reporting procedure the UE 115-a used. In some examples, the UE 115-a may choose which reporting procedure to use on a measurement report 235 basis. For example, the UE 115-a may determine and use the reporting procedure that may result in less error in RSRP or SINR estimation at the network entity 105-a.

Figure 3:
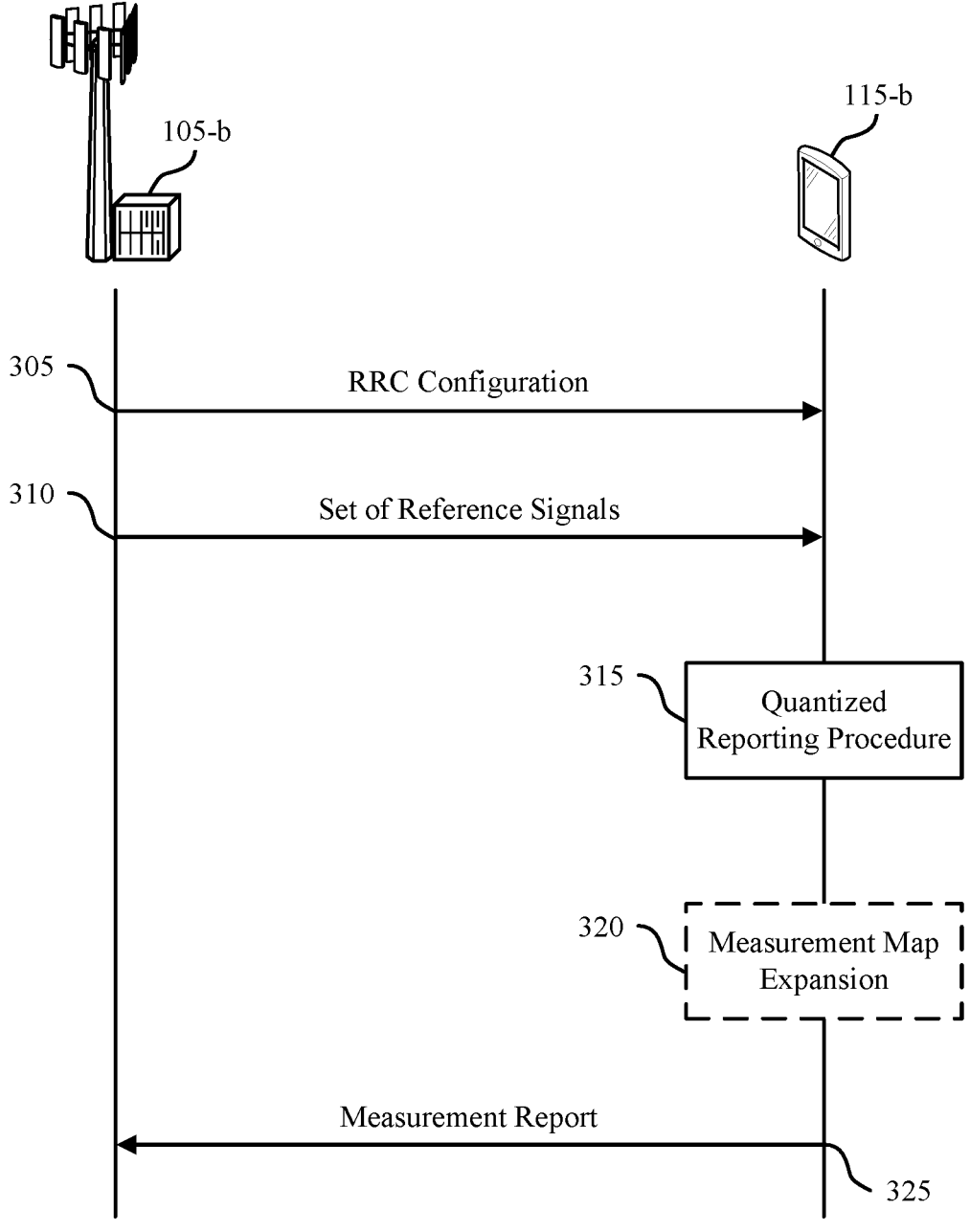
FIG. 3 illustrates an example of a process flow that supports improving accuracy of differential measurement reporting in accordance with one or more aspects of the present disclosure.

FIG. 3 illustrates an example of a process flow 300 that supports improving accuracy of differential measurement reporting in accordance with one or more aspects of the present disclosure. In some examples, process flow 300 may implement aspects of wireless communications system 100, and wireless communications system 200. Process flow 300 includes a UE 115-b and a network entity 105-b which may be respective examples of a UE 115 and a network entity 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 300 shows processes between a single UE 115 and a single network entity 105, it should be understood that these processes may occur between any number of network devices and network device types.

At 305, the UE 115-b may receive a message indicating one or more measurement parameters associated with a set of reference signals (e.g., RRC configuration message 210, with reference to FIG. 2). In some examples, the one or more measurement parameters may include a measurement object indicating time and frequency resources associated with the one or more reference signals, a measurement report configuration indicating one or more reporting parameters associated with generating the measurement report, a measurement identity that links the measurement object to the measurement report configuration, one or more layer 3 parameters, or any combination thereof.

At 310, the UE 115-b may receive a set of reference signals from the network entity 105-b. For example, the UE 115-b receive a first reference signal of the set of reference signals and a second reference signal of the set of reference signals. The first reference signal may be associated with a first measurement value and the second reference signal may be associated with a second measurement value. In some examples, the first measurement value and the second measurement value may be based on the one or more measurement parameters received, at 305. For example, the first measurement value and the second measurement value may be both RSRP values or both SINR values based on the one or more measurement parameters.

In some examples, the UE 115-b may receive the first reference signal via a first frequency from a first cell of the network entity 105-b and receive the second reference signal via the first frequency from a second cell of the network entity 105-b. In some examples, the UE 115-b may receive the first reference signal at via a first frequency from a first cell of the network entity 105-b and receive the second reference signal via a second frequency from the first cell.

At 315, the UE 115-b may perform a quantized reporting procedure (e.g., the quantized reporting procedure 230, with reference to FIG. 2). For example, the UE 115-b may determine based on a measurement mapping indicating a set of measurement value ranges, that the first measurement value is within a first measurement value range of the set of measurement value ranges (e.g., Table 2 or Table 5, with reference to FIG. 2). As such, the UE 115-b may determine a quantized value of the first measurement value as a middle value of the first measurement value range. Using the quantized value of the first measurement value, the UE 115-b may determine a quantized differential value. For example, the UE 115-b may a obtain a differential value based on a difference between the second measurement value and the quantized value of the first measurement value. The UE 115-b may determine based on a differential measurement mapping indicating a set of differential value ranges, that the differential value is within a first differential value range of the set of differential value ranges (e.g., Table 3 or Table 6, with reference to FIG. 2). As such, the UE 115-b may determine the quantized differential value as a middle value of the first differential value range.

In some examples, the UE 115-b may determine that the first measurement value is outside a range of a set of measurement value ranges included in the measurement mapping. In such examples, at 320, the UE 115-b may generate one or more additional measurement value ranges for the measurement mapping, where the first measurement value may be within an additional measurement value range of the one or more additional measurement value ranges.

At 325, the UE 115-b may transmit a measurement report indicating the quantized value of the first measurement value and indicating the quantized differential value corresponding to the first measurement value and the second measurement value. In some examples, the quantized differential value may be based on a difference between the second measurement value and the quantized value of the first measurement value (e.g., as described at 315).

Figure 4:
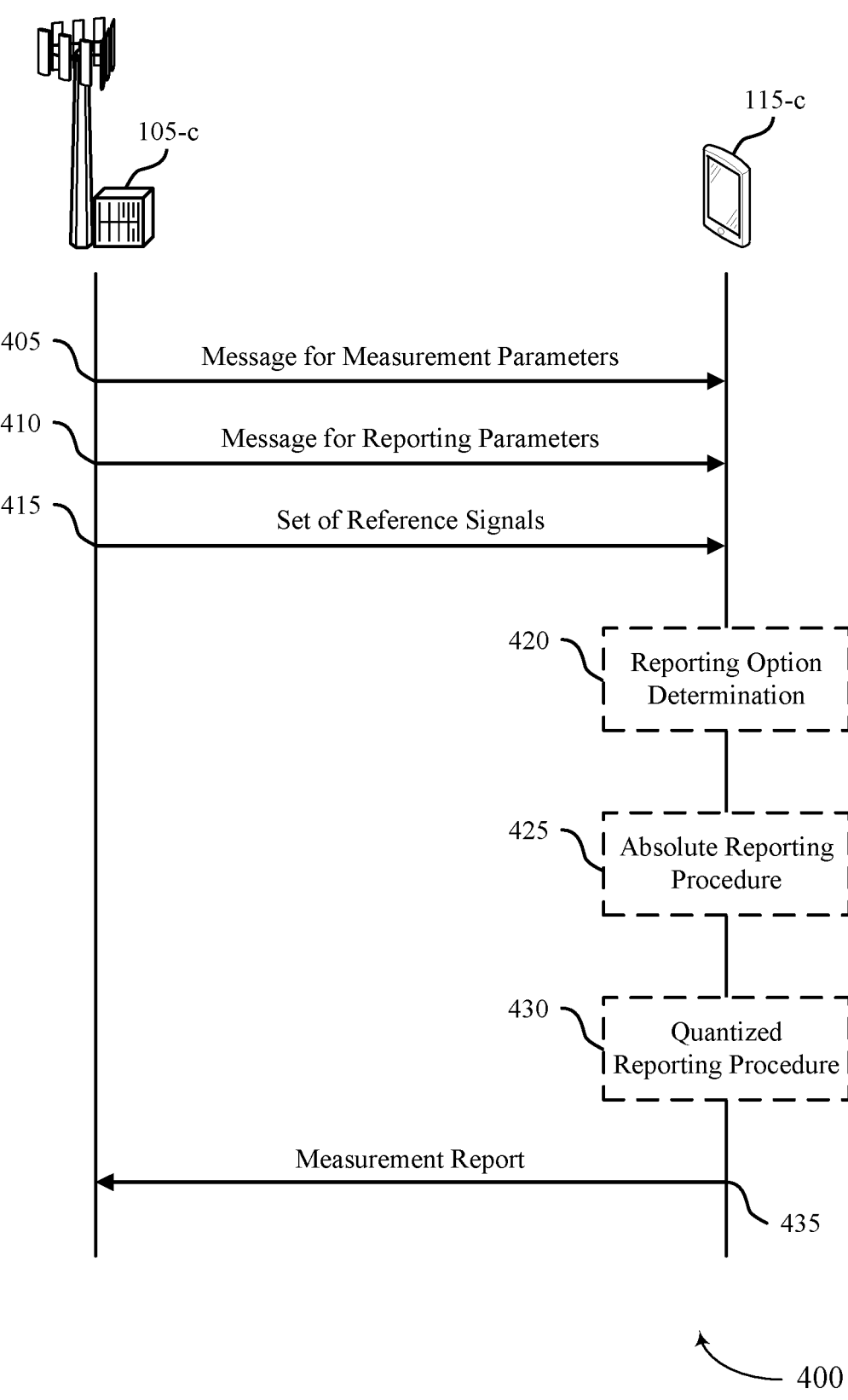
FIG. 4 illustrates an example of a process flow that supports improving accuracy of differential measurement reporting in accordance with one or more aspects of the present disclosure.

FIG. 4 illustrates an example of a process flow 400 that supports improving accuracy of differential measurement reporting in accordance with one or more aspects of the present disclosure. In some examples, process flow 400 may implement aspects of wireless communications system 100, wireless communications system 200, and process flow 300. Process flow 400 includes a UE 115-c and a network entity 105-c which may be respective examples of a UE 115 and a network entity 105, as described with reference to FIGS. 1 through 3. Alternative examples of the following may be implemented, where some steps are performed in a different order than described or are not performed at all. In some cases, steps may include additional features not mentioned below, or further steps may be added. In addition, while process flow 400 shows processes between a single UE 115 and a single network entity 105, it should be understood that these processes may occur between any number of network devices and network device types.

At 405, the UE 115-*c* may receive a first message indicating one or more measurement parameters associated with a set of reference signals.

At 410, the UE 115-*c* may receive a second message indicating one or more reporting parameters associated with a measurement report for the set of reference signals. In some examples, the first message and the second message may be included in an RRC configuration message (e.g., RRC configuration message 210, with reference to FIG. 2).

At 415, the UE 115-*c* may receive a first reference signal of the set of reference signals and a second reference signal of the set of reference signals. In some examples, the first reference signal may be associated with a first measurement value and the second reference signal may be associated with a second measurement value. In some examples, the first measurement value and the second measurement value may be based on the one or more measurement parameters.

At 420, the UE 115-*c* may perform a reporting option configuration. For example, the UE 115-*c* may receive as part of the first message, the second message, or both, a bit-value indicating a reporting option from the set of reporting options, where the reporting option is selected in accordance with the bit-value. In some examples, the set of reporting options may include generating a measurement report in accordance with an absolute reporting option (e.g., absolute reporting procedure 225, with reference to FIG. 2) or generating a measurement report in accordance with a quantized reporting option (e.g., quantized reporting procedure 230, with reference to FIG. 2).

In some examples, the UE 115-*c* may determine which reporting option to use based on an error associated with each reporting option. For example, the UE 115-*c* may determine, using the absolute reporting option, a first measurement associated with the first reference signal and the second reference signal, the first measurement having a first error. The UE 115-*c* may also determine, using the quantized reporting option, a second measurement associated with the first reference signal and the second reference signal, the second measurement having a second error. As such the UE 115-*c* may select the reporting option based on which of the first error and the second error is lower.

In some examples, the UE 115-*c* may determine to perform the absolute reporting option. As such, at 425, the UE 115-*c* may obtain a differential value using a difference between the second measurement value and the first measurement value. The UE 115-*c* may determine, based on a differential measurement mapping indicating a set of differential value ranges, that the differential value may be within a first differential value range of the set of differential value ranges. As such, the UE 115-*c* may determine a middle value of the first differential value range.

In some examples, the UE 115-*c* may determine to perform the quantized reporting option. As such, at 430, the UE 115-*c* may determine, based on a measurement mapping indicating a set of measurement value ranges, that the first measurement value may be within a first measurement value range of the set of measurement value ranges. The UE 115-*c* may determine a quantized value of the first measurement value as a middle value of the first measurement value range. The UE 115-*c* may measure a differential value using a difference between the second measurement value and the quantized value of the first measurement value. The UE 115-*c* may determine, based on a differential measurement mapping indicating a set of differential value ranges, that the differential value may be within a first differential value range of the set of differential value ranges. As such, the UE 115-*c* may determine a quantized differential value as a middle value of the first differential value range.

At 435, the UE 115-*c* may transmit the measurement report based on the one or more reporting parameters and in accordance with a reporting option selected from a set of reporting options for the measurement report, where the measurement report may indicate one or more measurements associated with the first reference signal and the second reference signal. In some examples, the measurement report may include a bit-value indicating the reporting option selected from a set of reporting options.

Figure 5:
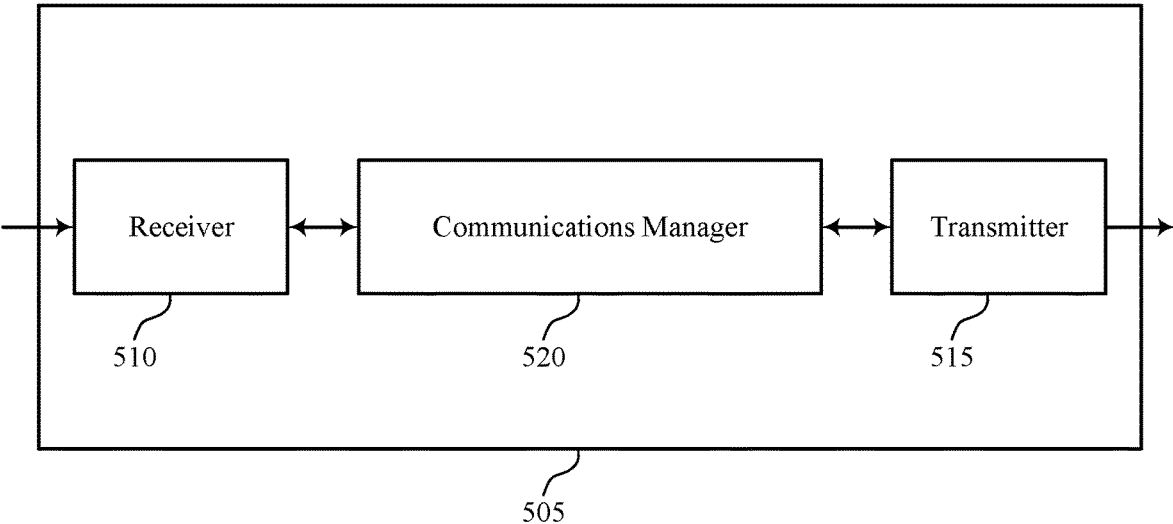
FIGS. 5 and 6 illustrate block diagrams of devices that support improving accuracy of differential measurement reporting in accordance with one or more aspects of the present disclosure.

FIG. 5 illustrates a block diagram 500 of a device 505 that supports improving accuracy of differential measurement reporting in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to improving accuracy of differential measurement reporting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to improving accuracy of differential measurement reporting). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of improving accuracy of differential measurement reporting as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 may be configured as or otherwise support a means for receiving a message indicating one or more measurement parameters associated with a set of reference signals. The communications manager 520 may be configured as or otherwise support a means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The communications manager 520 may be configured as or otherwise support a means for transmitting a measurement report indicating a quantized value of the first measurement value and indicating a quantized differential value corresponding to the second measurement value, where the quantized differential value is based on a difference between the second measurement value and the quantized value of the first measurement value.

Additionally, or alternatively, the communications manager 520 may support wireless communications in accordance with examples as disclosed herein. For example, the communications manager 520 may be configured as or otherwise support a means for receiving a first message indicating one or more measurement parameters associated with a set of reference signals. The communications manager 520 may be configured as or otherwise support a means for receiving a second message indicating one or more reporting parameters associated with a measurement report for the set of reference signals. The communications manager 520 may be configured as or otherwise support a means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The communications manager 520 may be configured as or otherwise support a means for transmitting the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for increase in measurement estimation accuracy and a more efficient utilization of communication resources.

Figure 6:
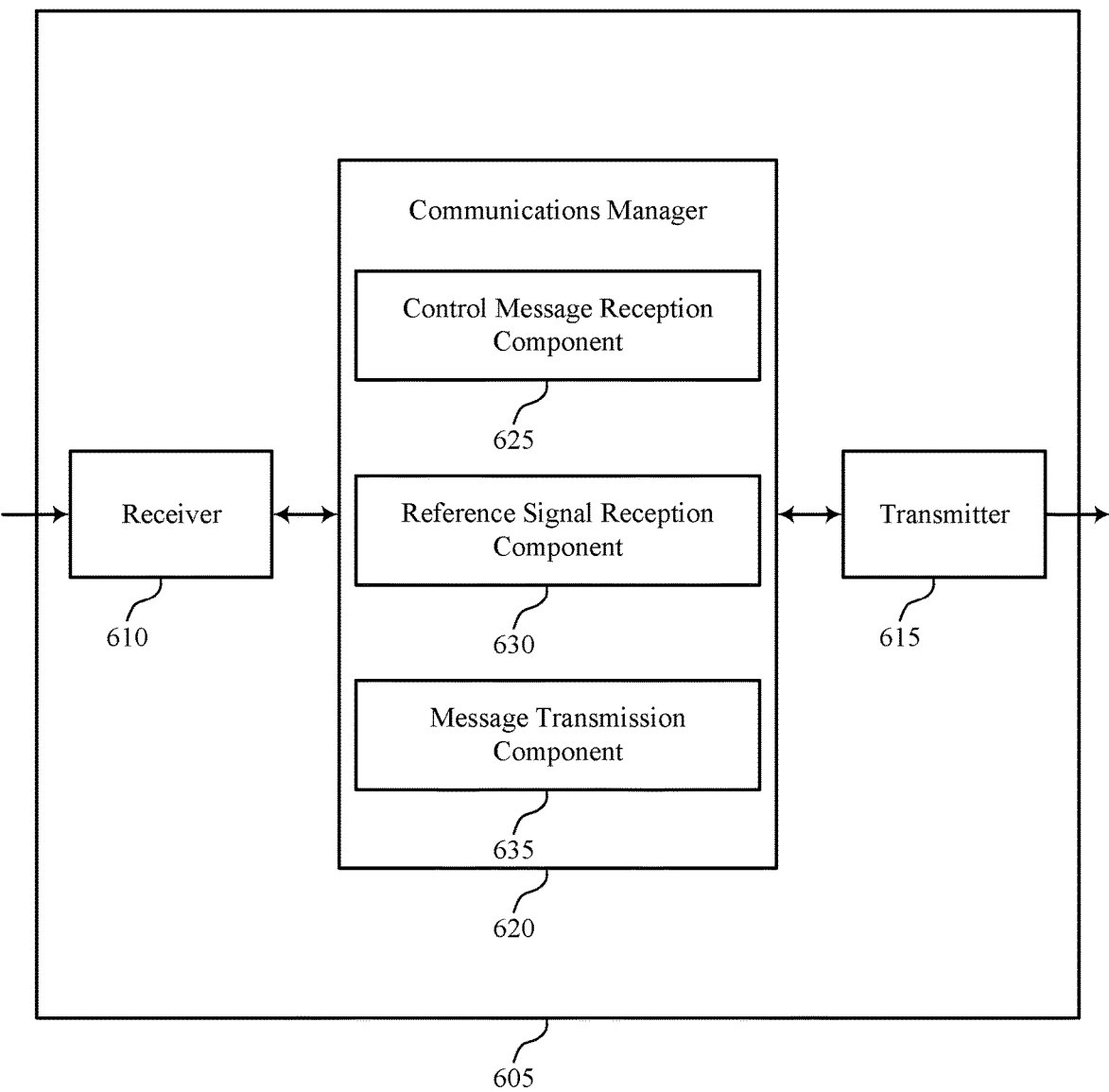

FIG. 6 illustrates a block diagram 600 of a device 605 that supports improving accuracy of differential measurement reporting in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to improving accuracy of differential measurement reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to improving accuracy of differential measurement reporting). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of improving accuracy of differential measurement reporting as described herein. For example, the communications manager 620 may include a control message reception component 625, a reference signal reception component 630, a message transmission component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The control message reception component 625 may be configured as or otherwise support a means for receiving a message indicating one or more measurement parameters associated with a set of reference signals. The reference signal reception component 630 may be configured as or otherwise support a means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The message transmission component 635 may be configured as or otherwise support a means for transmitting a measurement report indicating a quantized value of the first measurement value and indicating a quantized differential value corresponding to the second measurement value, where the quantized differential value is based on a difference between the second measurement value and the quantized value of the first measurement value.

Additionally, or alternatively, the communications manager 620 may support wireless communications in accordance with examples as disclosed herein. The control message reception component 625 may be configured as or otherwise support a means for receiving a first message indicating one or more measurement parameters associated with a set of reference signals. The control message reception component 625 may be configured as or otherwise support a means for receiving a second message indicating one or more reporting parameters associated with a measurement report for the set of reference signals. The reference signal reception component 630 may be configured as or otherwise support a means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The message transmission component 635 may be configured as or otherwise support a means for transmitting the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal.

Figure 7:
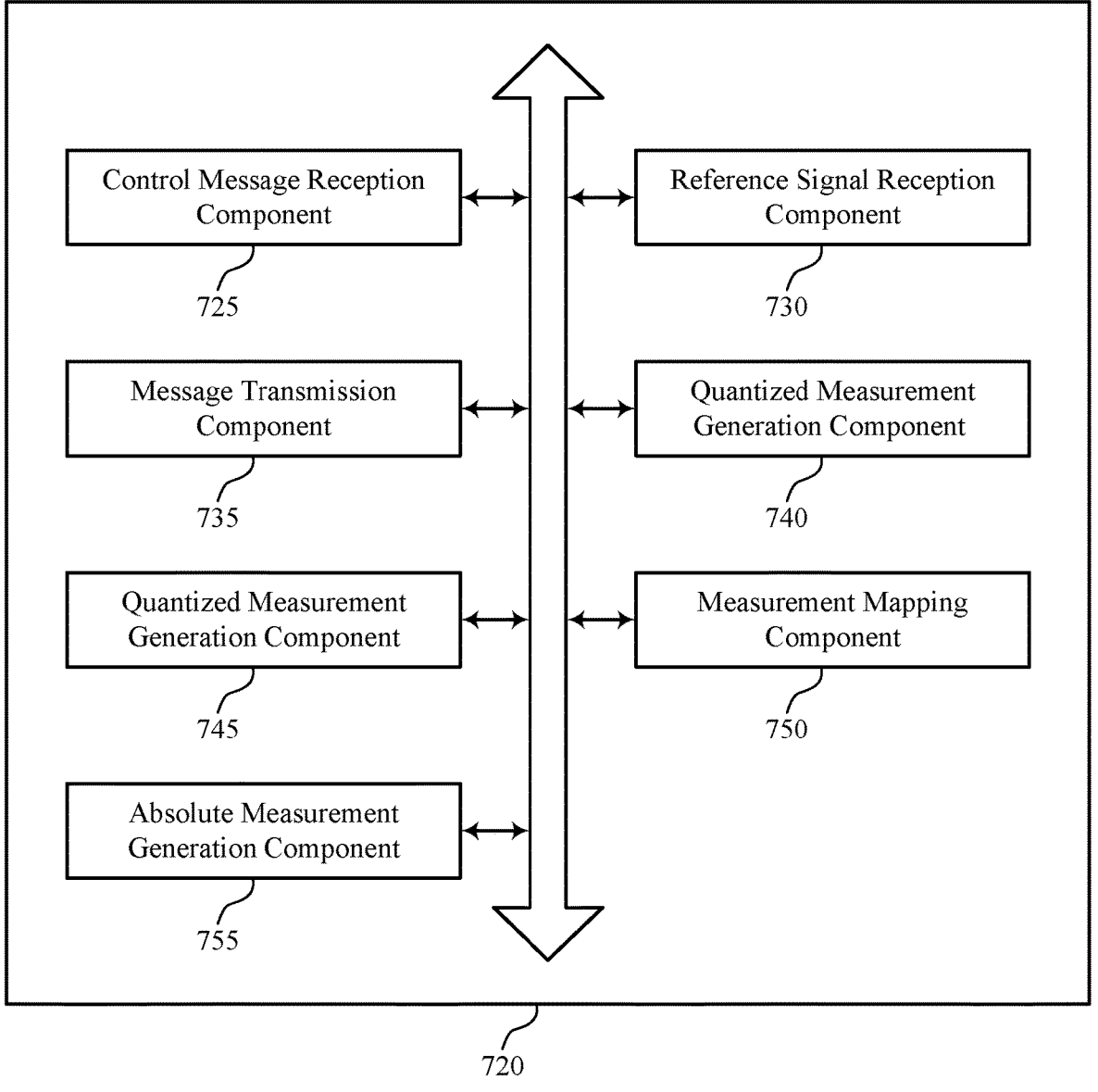
FIG. 7 illustrates a block diagram of a communications manager that supports improving accuracy of differential measurement reporting in accordance with one or more aspects of the present disclosure.

FIG. 7 illustrates a block diagram 700 of a communications manager 720 that supports improving accuracy of differential measurement reporting in accordance with one or more aspects of the present disclosure. The communications manager 720 may be an example of aspects of a communications manager 520, a communications manager 620, or both, as described herein. The communications manager 720, or various components thereof, may be an example of means for performing various aspects of improving accuracy of differential measurement reporting as described herein. For example, the communications manager 720 may include a control message reception component 725, a reference signal reception component 730, a message transmission component 735, a quantized measurement generation component 740, a quantized measurement generation component 745, a measurement mapping component 750, an absolute measurement generation component 755, or any combination thereof. Each of these components may communicate, directly or indirectly, with one another (e.g., via one or more buses).

The communications manager 720 may support wireless communications in accordance with examples as disclosed herein. The control message reception component 725 may be configured as or otherwise support a means for receiving a message indicating one or more measurement parameters associated with a set of reference signals. The reference signal reception component 730 may be configured as or otherwise support a means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The message transmission component 735 may be configured as or otherwise support a means for transmitting a measurement report indicating a quantized value of the first measurement value and indicating a quantized differential value corresponding to the second measurement value, where the quantized differential value is based on a difference between the second measurement value and the quantized value of the first measurement value.

In some examples, the reference signal reception component 730 may be configured as or otherwise support a means for receiving, at a first frequency via a first cell, the first reference signal of the set of reference signals. In some examples, the reference signal reception component 730 may be configured as or otherwise support a means for receiving, at the first frequency via a second cell different from the first cell, the second reference signal of the set of reference signals.

In some examples, the reference signal reception component 730 may be configured as or otherwise support a means for receiving, via a first cell at a first frequency, the first reference signal of the set of reference signals. In some examples, the reference signal reception component 730 may be configured as or otherwise support a means for receiving, via the first cell at a second frequency different than the first frequency, the second reference signal of the set of reference signals.

In some examples, the quantized measurement generation component 740 may be configured as or otherwise support a means for determining, based on a measurement mapping indicating a set of measurement value ranges, that the first measurement value is within a first measurement value range of the set of measurement value ranges. In some examples, the quantized measurement generation component 745 may be configured as or otherwise support a means for determining the quantized value of the first measurement value as a middle value of the first measurement value range.

In some examples, the quantized measurement generation component 745 may be configured as or otherwise support a means for obtaining a differential value based on a difference between the second measurement value and the quantized value of the first measurement value. In some examples, the quantized measurement generation component 745 may be configured as or otherwise support a means for determining, based on a differential measurement mapping indicating a set of differential value ranges, that the differential value is within a first differential value range of the set of differential value ranges. In some examples, the quantized measurement generation component 745 may be configured as or otherwise support a means for determining the quantized differential value of the first measurement value as a middle value of the first differential value range.

In some examples, the measurement mapping component 750 may be configured as or otherwise support a means for determining that the first measurement value is outside a range of a set of measurement value ranges included in a measurement mapping. In some examples, the measurement mapping component 750 may be configured as or otherwise support a means for generating one or more additional measurement value ranges for the measurement mapping, where the first measurement value is within an additional measurement value range of the one or more additional measurement value ranges.

In some examples, the control message reception component 725 may be configured as or otherwise support a means for receiving, via radio resource control signaling, the message indicating the one or more measurement parameters as part of a radio resource control configuration.

In some examples, the one or more measurement parameters include a measurement object indicating time and frequency resources associated with the set of reference signals, a measurement report configuration indicating one or more reporting parameters associated with generating the measurement report, a measurement identity that links the measurement object to the measurement report configuration, one or more layer 3 parameters, or any combination thereof.

In some examples, the first measurement value and the second measurement value are both RSRP values or both SINR values based on the one or more measurement parameters.

In some examples, the control message reception component 725 may be configured as or otherwise support a means for receiving, a bit-value indicating a reporting option from a set of reporting options, where transmitting the measurement report indicating the quantized value of the first measurement value and indicating the quantized differential value is based on receiving the bit-value.

Additionally, or alternatively, the communications manager 720 may support wireless communications in accordance with examples as disclosed herein. In some examples, the control message reception component 725 may be configured as or otherwise support a means for receiving a first message indicating one or more measurement parameters associated with a set of reference signals. In some examples, the control message reception component 725 may be configured as or otherwise support a means for receiving a second message indicating one or more reporting parameters associated with a measurement report for the set of reference signals. In some examples, the reference signal reception component 730 may be configured as or otherwise support a means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. In some examples, the message transmission component 735 may be configured as or otherwise support a means for transmitting the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal.

In some examples, the control message reception component 725 may be configured as or otherwise support a means for receiving, as part of the first message, the second message, or both, a bit-value indicating the reporting option selected from the set of reporting options, where the reporting option is selected in accordance with the bit-value.

In some examples, the message transmission component 735 may be configured as or otherwise support a means for transmitting, as part of the measurement report, a bit-value indicating the reporting option selected from a set of reporting options.

In some examples, the absolute measurement generation component 755 may be configured as or otherwise support a means for determining, using the absolute reporting option, a first measurement associated with the first reference signal and the second reference signal, the first measurement having a first error. In some examples, the quantized measurement generation component 745 may be configured as or otherwise support a means for determining, using the quantized reporting option, a second measurement associated with the first reference signal and the second reference signal, the second measurement having a second error, where the reporting option selected is based on which of the first error and the second error is lower.

In some examples, to support absolute reporting option, the absolute measurement generation component 755 may be configured as or otherwise support a means for obtaining a differential value using a difference between the second measurement value and the first measurement value. In some examples, to support absolute reporting option, the absolute measurement generation component 755 may be configured as or otherwise support a means for determining, based on a differential measurement mapping indicating a set of differential value ranges, that the differential value is within a first differential value range of the set of differential value ranges. In some examples, to support absolute reporting option, the absolute measurement generation component 755 may be configured as or otherwise support a means for determining a middle value of the first differential value range.

In some examples, to support quantized reporting option, the quantized measurement generation component 745 may be configured as or otherwise support a means for determining, based on a measurement mapping indicating a set of measurement value ranges, that the first measurement value is within a first measurement value range of the set of measurement value ranges. In some examples, to support quantized reporting option, the quantized measurement generation component 745 may be configured as or otherwise support a means for determining a quantized value of the first measurement value as a middle value of the first measurement value range. In some examples, to support quantized reporting option, the quantized measurement generation component 745 may be configured as or otherwise support a means for measuring a differential value using a difference between the second measurement value and the quantized value of the first measurement value. In some examples, to support quantized reporting option, the quantized measurement generation component 745 may be configured as or otherwise support a means for determining, based on a differential measurement mapping indicating a set of differential value ranges, that the differential value is within a first differential value range of the set of differential value ranges. In some examples, to support quantized reporting option, the quantized measurement generation component 745 may be configured as or otherwise support a means for determining a quantized differential value as a middle value of the first differential value range.

Figure 8:
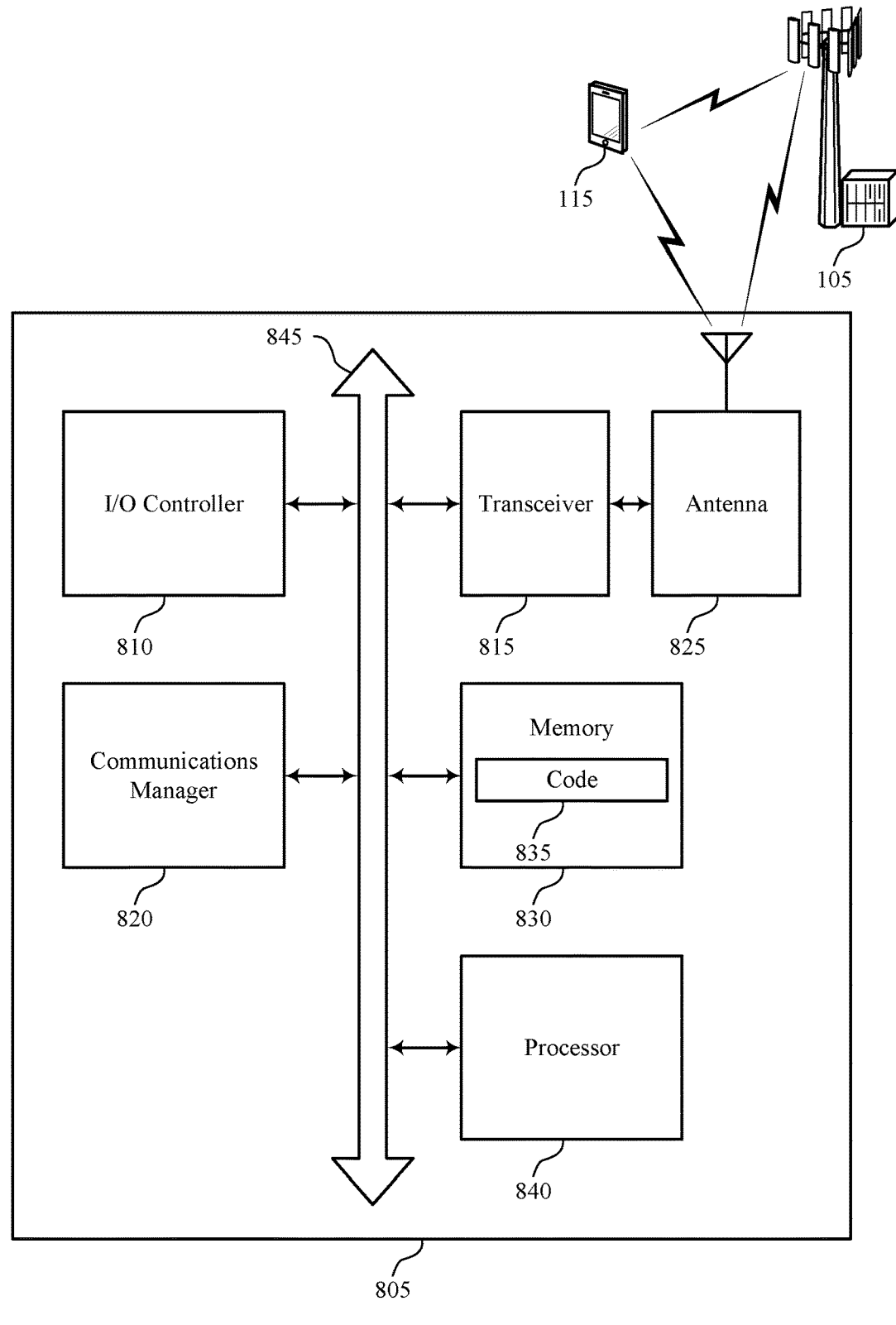
FIG. 8 illustrates a diagram of a system including a device that supports improving accuracy of differential measurement reporting in accordance with one or more aspects of the present disclosure.

FIG. 8 illustrates a diagram of a system 800 including a device 805 that supports improving accuracy of differential measurement reporting in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bidirectional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bidirectionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting improving accuracy of differential measurement reporting). For example, the device 805 or a component of the device 805 may include a processor 840 and memory 830 coupled with or to the processor 840, the processor 840 and memory 830 configured to perform various functions described herein.

The communications manager 820 may support wireless communications in accordance with examples as disclosed herein. For example, the communications manager 820 may be configured as or otherwise support a means for receiving a message indicating one or more measurement parameters associated with a set of reference signals. The communications manager 820 may be configured as or otherwise support a means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The communications manager 820 may be configured as or otherwise support a means for transmitting a measurement report indicating a quantized value of the first measurement value and indicating a quantized differential value corresponding to the second measurement value, where the quantized differential value is based on a difference between the second measurement value and the quantized value of the first measurement value.

Additionally, or alternatively, the communications manager 820 may support wireless communications in accordance with examples as disclosed herein. For example, the communications manager 820 may be configured as or otherwise support a means for receiving a first message indicating one or more measurement parameters associated with a set of reference signals. The communications manager 820 may be configured as or otherwise support a means for receiving a second message indicating one or more reporting parameters associated with a measurement report for the set of reference signals. The communications manager 820 may be configured as or otherwise support a means for receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The communications manager 820 may be configured as or otherwise support a means for transmitting the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal.

By including or configuring the communications manager 820 in accordance with examples as described herein, the device 805 may support techniques for increase in measurement estimation accuracy, a more efficient utilization of communication resources, improved communication reliability, reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of improving accuracy of differential measurement reporting as described herein, or the processor 840 and the memory 830 may be otherwise configured to perform or support such operations.

Figure 9:
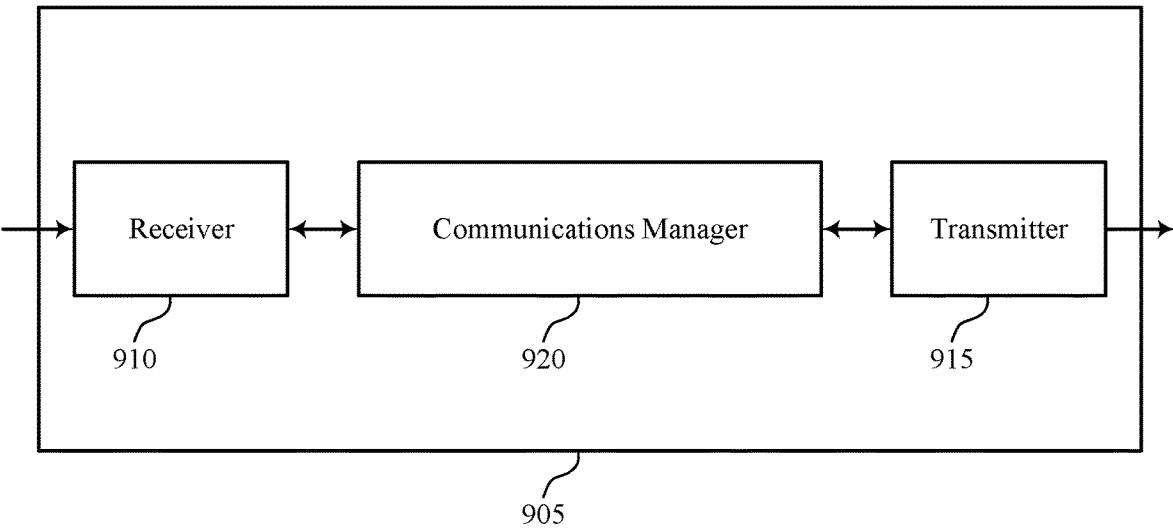
FIGS. 9 and 10 illustrate block diagrams of devices that support improving accuracy of differential measurement reporting in accordance with one or more aspects of the present disclosure.

FIG. 9 illustrates a block diagram 900 of a device 905 that supports improving accuracy of differential measurement reporting in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter

915 and the receiver 910 may be co-located in a transceiver, which may include or be coupled with a modem.

The communications manager 920, the receiver 910, the transmitter 915, or various combinations thereof or various components thereof may be examples of means for performing various aspects of improving accuracy of differential measurement reporting as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 may be configured as or otherwise support a means for transmitting a first message indicating one or more measurement parameters associated with a set of reference signals. The communications manager 920 may be configured as or otherwise support a means for transmitting a second message indicating one or more reporting parameters associated with a measurement report for the set of reference signals. The communications manager 920 may be configured as or otherwise support a means for transmitting a third message indicating a reporting option from a set of reporting options to use for generating the measurement report. The communications manager 920 may be configured as or otherwise support a means for transmitting a first reference signal of the set of reference signals and a second reference signal of the set of reference signals. The communications manager 920 may be configured as or otherwise support a means for receiving the measurement report based on the one or more reporting parameters and in accordance with the reporting option indicated in the third message, the measurement report indicating one or more measurements associated with the first reference signal and the second reference signal.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for increase in measurement estimation accuracy and a more efficient utilization of communication resources.

Figure 10:
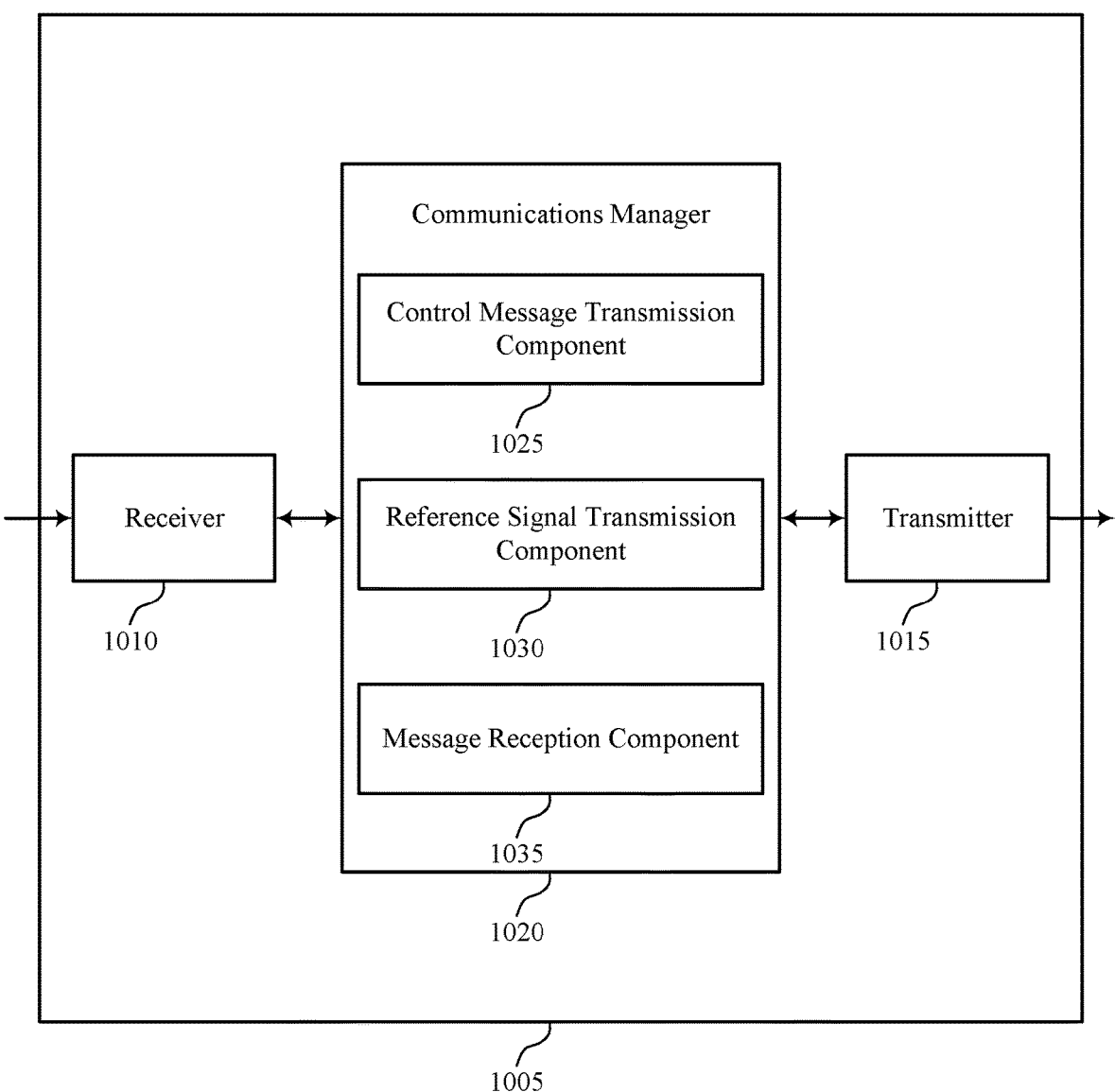

FIG. 10 illustrates a block diagram 1000 of a device 1005 that supports improving accuracy of differential measurement reporting in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of improving accuracy of differential measurement reporting as described herein. For example, the communications manager 1020 may include a control message transmission component 1025, a reference signal transmission component 1030, a message reception component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The control message transmission component 1025 may be configured as or otherwise support a means for transmitting a first message indicating one or more measurement parameters associated with a set of reference signals. The control message transmission component 1025 may be configured as or otherwise support a means for transmitting a second message indicating one or more reporting parameters associated with a measurement report for the set of reference signals. The control message transmission component 1025 may be configured as or otherwise support a means for transmitting a third message indicating a reporting option from a set of reporting options to use for generating the measurement report. The reference signal transmission component 1030 may be configured as or otherwise support a means for transmitting a first reference signal of the set of reference signals and a second reference signal of the set of reference signals. The message reception component 1035 may be configured as or otherwise support a means for receiving the measurement report based on the one or more reporting parameters and in accordance with the reporting option indicated in the third message, the measurement report indicating one or more measurements associated with the first reference signal and the second reference signal.

Figure 11:
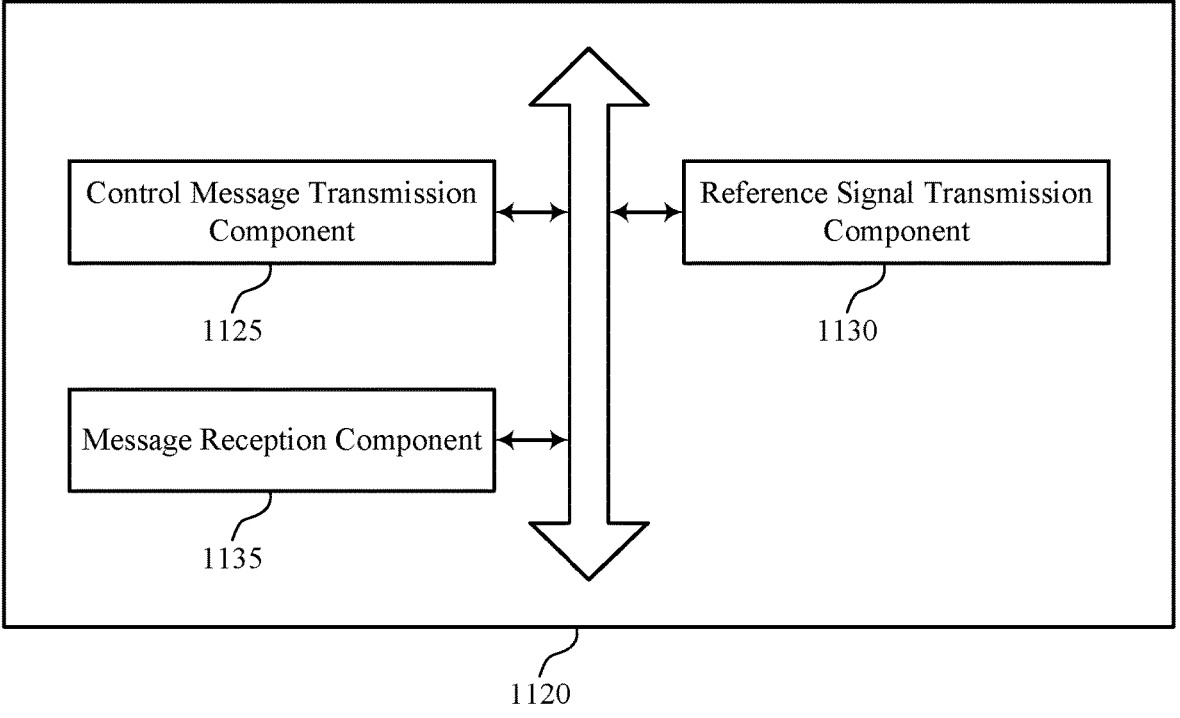
FIG. 11 illustrates a block diagram of a communications manager that supports improving accuracy of differential measurement reporting in accordance with one or more aspects of the present disclosure.

FIG. 11 illustrates a block diagram 1100 of a communications manager 1120 that supports improving accuracy of differential measurement reporting in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of improving accuracy of differential measurement reporting as described herein. For example, the communications manager 1120 may include a control message transmission component 1125, a reference signal transmission component 1130, a message reception component 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The control message transmission component 1125 may be configured as or otherwise support a means for transmitting a first message indicating one or more measurement parameters associated with a set of reference signals. In some examples, the control message transmission component 1125 may be configured as or otherwise support a means for transmitting a second message indicating one or more reporting parameters associated with a measurement report for the set of reference signals. In some examples, the control message transmission component 1125 may be configured as or otherwise support a means for transmitting a third message indicating a reporting option from a set of reporting options to use for generating the measurement report. The reference signal transmission component 1130 may be configured as or otherwise support a means for transmitting a first reference signal of the set of reference signals and a second reference signal of the set of reference signals. The message reception component 1135 may be configured as or otherwise support a means for receiving the measurement report based on the one or more reporting parameters and in accordance with the reporting option indicated in the third message, the measurement report indicating one or more measurements associated with the first reference signal and the second reference signal.

In some examples, the control message transmission component 1125 may be configured as or otherwise support a means for transmitting, as part of the first message, the second message, or both, a bit-value indicating the reporting option from the set of reporting options.

In some examples, the message reception component 1135 may be configured as or otherwise support a means for receiving, as part of the measurement report, a bit-value indicating the reporting option from the set of reporting options.

In some examples, the set of reporting options include an absolute reporting option and a quantized reporting option.

Figure 12:
FIG. 12 illustrates a diagram of a system including a device that supports improving accuracy of differential measurement reporting in accordance with one or more aspects of the present disclosure.

FIG. 12 illustrates a diagram of a system 1200 including a device 1205 that supports improving accuracy of differential measurement reporting in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting improving accuracy of differential measurement reporting). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 may be configured as or otherwise support a means for transmitting a first message indicating one or more measurement parameters associated with a set of reference signals. The communications manager 1220 may be configured as or otherwise support a means for transmitting a second message indicating one or more reporting parameters associated with a measurement report for the set of reference signals. The communications manager 1220 may be configured as or otherwise support a means for transmitting a third message indicating a reporting option from a set of reporting options to use for generating the measurement report. The communications manager 1220 may be configured as or otherwise support a means for transmitting a first reference signal of the set of reference signals and a second reference signal of the set of reference signals. The communications manager 1220 may be configured as or otherwise support a means for receiving the measurement report based on the one or more reporting parameters and in accordance with the reporting option indicated in the third message, the measurement report indicating one or more measurements associated with the first reference signal and the second reference signal.

By including or configuring the communications manager 1220 in accordance with examples as described herein, the device 1205 may support techniques for increase in measurement estimation accuracy, a more efficient utilization of communication resources, improved communication reliability, reduced latency, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of improving accuracy of differential measurement reporting as described herein, or the processor 1235 and the memory 1225 may be otherwise configured to perform or support such operations.

FIG. 13 illustrates a flowchart showing a method 1300 that supports improving accuracy of differential measurement reporting in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a message indicating one or more measurement parameters associated with a set of reference signals. The operations of 1305 may be performed in accordance with examples as disclosed herein. In some examples, aspects of the operations of 1305 may be performed by a control message reception component 725 as described with reference to FIG. 7.

At 1310, the method may include receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The operations of 1310 may be performed in accordance with examples as disclosed herein.

In some examples, aspects of the operations of 1310 may be performed by a reference signal reception component 730 as described with reference to FIG. 7.

At 1315, the method may include transmitting a measurement report indicating a quantized value of the first measurement value and indicating a quantized differential value corresponding to the second measurement value, where the quantized differential value is based on a difference between the second measurement value and the quantized value of the first measurement value. The operations of 1315 may be performed in accordance with examples as disclosed herein. In some examples, aspects of the operations of 1315 may be performed by a message transmission component 735 as described with reference to FIG. 7.

FIG. 14 illustrates a flowchart showing a method 1400 that supports improving accuracy of differential measurement reporting in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a message indicating one or more measurement parameters associated with a set of reference signals. The operations of 1405 may be performed in accordance with examples as disclosed herein. In some examples, aspects of the operations of 1405 may be performed by a control message reception component 725 as described with reference to FIG. 7.

At 1410, the method may include receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The operations of 1410 may be performed in accordance with examples as disclosed herein. In some examples, aspects of the operations of 1410 may be performed by a reference signal reception component 730 as described with reference to FIG. 7.

At 1415, the method may include obtaining a differential value based on a difference between the second measurement value and the quantized value of the first measurement value. The operations of 1415 may be performed in accordance with examples as disclosed herein. In some examples, aspects of the operations of 1415 may be performed by a quantized measurement generation component 745 as described with reference to FIG. 7.

At 1420, the method may include determining, based on a differential measurement mapping indicating a set of differential value ranges, that the differential value is within a first differential value range of the set of differential value ranges. The operations of 1420 may be performed in accordance with examples as disclosed herein. In some examples, aspects of the operations of 1420 may be performed by a quantized measurement generation component 745 as described with reference to FIG. 7.

At 1425, the method may include determining the quantized differential value of the first measurement value as a middle value of the first differential value range. The operations of 1425 may be performed in accordance with examples as disclosed herein. In some examples, aspects of the operations of 1425 may be performed by a quantized measurement generation component 745 as described with reference to FIG. 7.

At 1430, the method may include transmitting a measurement report indicating a quantized value of the first measurement value and indicating a quantized differential value corresponding to the second measurement value, where the quantized differential value is based on a difference between the second measurement value and the quantized value of the first measurement value. The operations of 1430 may be performed in accordance with examples as disclosed herein. In some examples, aspects of the operations of 1430 may be performed by a message transmission component 735 as described with reference to FIG. 7.

FIG. 15 illustrates a flowchart showing a method 1500 that supports improving accuracy of differential measurement reporting in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a first message indicating one or more measurement parameters associated with a set of reference signals. The operations of 1505 may be performed in accordance with examples as disclosed herein. In some examples, aspects of the operations of 1505 may be performed by a control message reception component 725 as described with reference to FIG. 7.

At 1510, the method may include receiving a second message indicating one or more reporting parameters associated with a measurement report for the set of reference signals. The operations of 1510 may be performed in accordance with examples as disclosed herein. In some examples, aspects of the operations of 1510 may be performed by a control message reception component 725 as described with reference to FIG. 7.

At 1515, the method may include receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The operations of 1515 may be performed in accordance with examples as disclosed herein. In some examples, aspects of the operations of 1515 may be performed by a reference signal reception component 730 as described with reference to FIG. 7.

At 1520, the method may include transmitting the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal. The operations of 1520 may be performed in accordance with examples as disclosed herein. In some examples, aspects of the operations of 1520 may be performed by a message transmission component 735 as described with reference to FIG. 7.

FIG. 16 illustrates a flowchart showing a method 1600 that supports improving accuracy of differential measurement reporting in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving a first message indicating one or more measurement parameters associated with a set of reference signals. The operations of 1605 may be performed in accordance with examples as disclosed herein. In some examples, aspects of the operations of 1605 may be performed by a control message reception component 725 as described with reference to FIG. 7.

At 1610, the method may include receiving a second message indicating one or more reporting parameters associated with a measurement report for the set of reference signals. The operations of 1610 may be performed in accordance with examples as disclosed herein. In some examples, aspects of the operations of 1610 may be performed by a control message reception component 725 as described with reference to FIG. 7.

At 1615, the method may include receiving, as part of the first message, the second message, or both, a bit-value indicating the reporting option selected from the set of reporting options, where the reporting option is selected in accordance with the bit-value. The operations of 1615 may be performed in accordance with examples as disclosed herein. In some examples, aspects of the operations of 1615 may be performed by a control message reception component 725 as described with reference to FIG. 7.

At 1620, the method may include receiving a first reference signal of the set of reference signals and a second reference signal of the set of reference signals, the first reference signal associated with a first measurement value, the second reference signal associated with a second measurement value, where the first measurement value and the second measurement value are based on the one or more measurement parameters. The operations of 1620 may be performed in accordance with examples as disclosed herein. In some examples, aspects of the operations of 1620 may be performed by a reference signal reception component 730 as described with reference to FIG. 7.

At 1625, the method may include transmitting the measurement report based on the one or more reporting parameters and in accordance with a reporting option selected from a set of reporting options for the measurement report, the set of reporting options including an absolute reporting option and a quantized reporting option, the measurement report indicating one or more measurements associated with the first reference signal and the second reference signal. The operations of 1625 may be performed in accordance with examples as disclosed herein. In some examples, aspects of the operations of 1625 may be performed by a message transmission component 735 as described with reference to FIG. 7.

FIG. 17 illustrates a flowchart showing a method 1700 that supports improving accuracy of differential measurement reporting in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a first message indicating one or more measurement parameters associated with a set of reference signals. The operations of 1705 may be performed in accordance with examples as disclosed herein. In some examples, aspects of the operations of 1705 may be performed by a control message transmission component 1125 as described with reference to FIG. 11.

At 1710, the method may include transmitting a second message indicating one or more reporting parameters associated with a measurement report for the set of reference signals. The operations of 1710 may be performed in accordance with examples as disclosed herein. In some examples, aspects of the operations of 1710 may be performed by a control message transmission component 1125 as described with reference to FIG. 11.

At 1715, the method may include transmitting a third message indicating a reporting option from a set of reporting options to use for generating the measurement report. The operations of 1715 may be performed in accordance with examples as disclosed herein. In some examples, aspects of the operations of 1715 may be performed by a control message transmission component 1125 as described with reference to FIG. 11.

At 1720, the method may include transmitting a first reference signal of the set of reference signals and a second reference signal of the set of reference signals. The operations of 1720 may be performed in accordance with examples as disclosed herein. In some examples, aspects of the operations of 1720 may be performed by a reference signal transmission component 1130 as described with reference to FIG. 11.

At 1725, the method may include receiving the measurement report based on the one or more reporting parameters and in accordance with the reporting option indicated in the third message, the measurement report indicating one or more measurements associated with the first reference signal and the second reference signal. The operations of 1725 may be performed in accordance with examples as disclosed herein. In some examples, aspects of the operations of 1725 may be performed by a message reception component 1135 as described with reference to FIG. 11.

Figure 18:
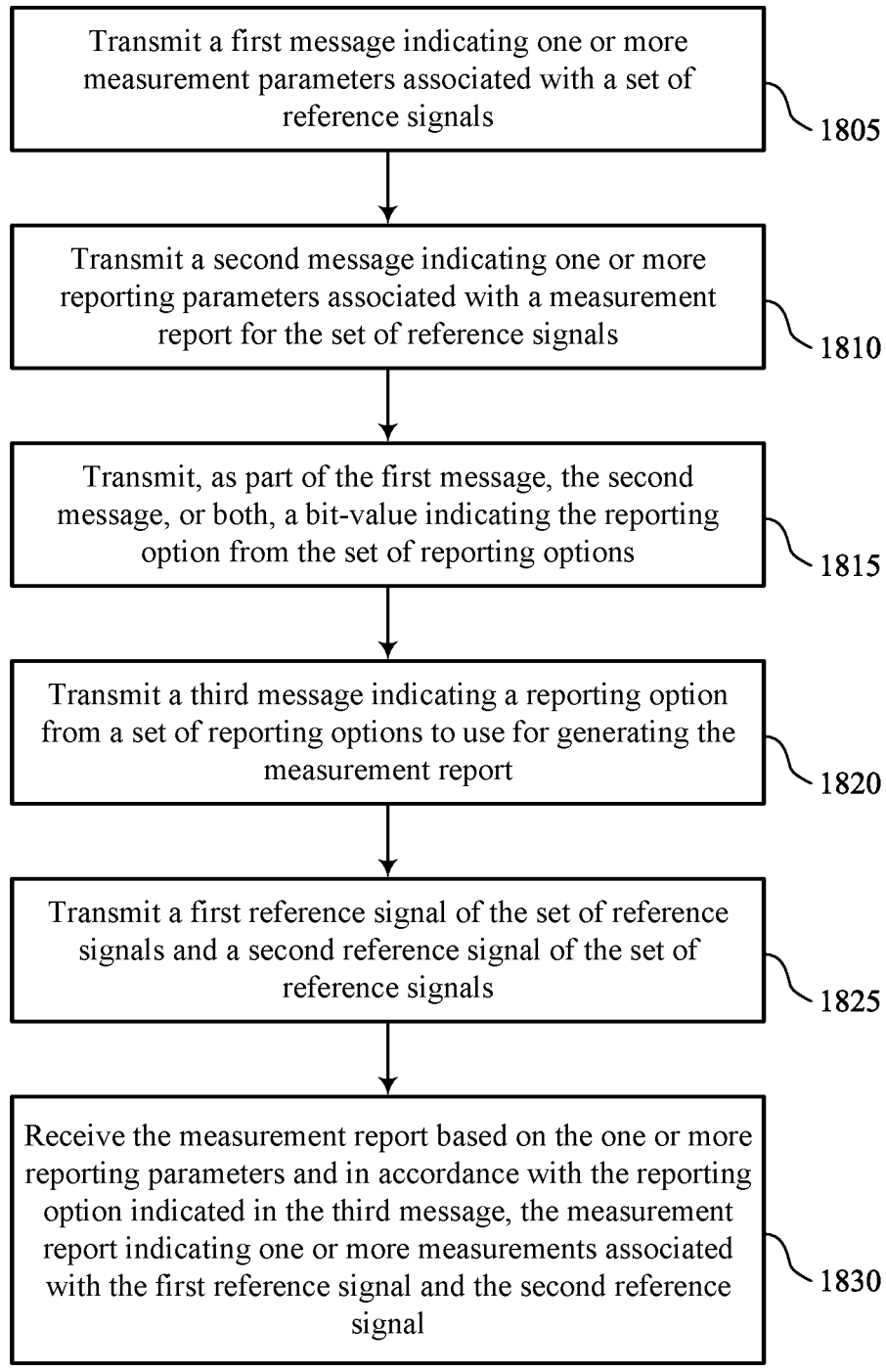

FIG. 18 illustrates a flowchart showing a method 1800 that supports improving accuracy of differential measurement reporting in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a first message indicating one or more measurement parameters associated with a set of reference signals. The operations of 1805 may be performed in accordance with examples as disclosed herein. In some examples, aspects of the operations of 1805 may be performed by a control message transmission component 1125 as described with reference to FIG. 11.

At 1810, the method may include transmitting a second message indicating one or more reporting parameters associated with a measurement report for the set of reference signals. The operations of 1810 may be performed in accordance with examples as disclosed herein. In some examples, aspects of the operations of 1810 may be performed by a control message transmission component 1125 as described with reference to FIG. 11.

At 1815, the method may include transmitting, as part of the first message, the second message, or both, a bit-value indicating the reporting option from the set of reporting options. The operations of 1815 may be performed in accordance with examples as disclosed herein. In some examples, aspects of the operations of 1815 may be performed by a control message transmission component 1125 as described with reference to FIG. 11.

At 1820, the method may include transmitting a third message indicating a reporting option from a set of reporting options to use for generating the measurement report. The operations of 1820 may be performed in accordance with examples as disclosed herein. In some examples, aspects of the operations of 1820 may be performed by a control message transmission component 1125 as described with reference to FIG. 11.

At 1825, the method may include transmitting a first reference signal of the set of reference signals and a second reference signal of the set of reference signals. The operations of 1825 may be performed in accordance with examples as disclosed herein. In some examples, aspects of the operations of 1825 may be performed by a reference signal transmission component 1130 as described with reference to FIG. 11.

At 1830, the method may include receiving the measurement report based on the one or more reporting parameters and in accordance with the reporting option indicated in the third message, the measurement report indicating one or more measurements associated with the first reference signal and the second reference signal. The operations of 1830 may be performed in accordance with examples as disclosed herein. In some examples, aspects of the operations of 1830 may be performed by a message reception component 1135 as described with reference to FIG. 11.

The following provides an overview of aspects of the present disclosure:

Aspect 1: A method for wireless communications, at a UE, comprising: receiving a message indicating one or more measurement parameters associated with a set of reference signals; receiving a first reference signal of the set of reference signals and a second reference signal of the set of reference signals, the first reference signal associated with a first measurement value, the second reference signal associated with a second measurement value, wherein the first measurement value and the second measurement value are based at least in part on the one or more measurement parameters; and transmitting a measurement report indicating a quantized value of the first measurement value and indicating a quantized differential value corresponding to the second measurement value, wherein the quantized differential value is based at least in part on a difference between the second measurement value and the quantized value of the first measurement value.

Aspect 2: The method of aspect 1, further comprising: receiving, at a first frequency via a first cell, the first reference signal of the set of reference signals; and receiving, at the first frequency via a second cell different from the first cell, the second reference signal of the set of reference signals.

Aspect 3: The method of any of aspects 1 through 2, further comprising: receiving, via a first cell at a first frequency, the first reference signal of the set of reference signals; and receiving, via the first cell at a second frequency different than the first frequency, the second reference signal of the set of reference signals.

Aspect 4: The method of any of aspects 1 through 3, further comprising: determining, based at least in part on a measurement mapping indicating a set of measurement value ranges, that the first measurement value is within a first measurement value range of the set of measurement value ranges; and determining the quantized value of the first measurement value as a middle value of the first measurement value range.

Aspect 5: The method of any of aspects 1 through 4, further comprising: obtaining a differential value based at least in part on a difference between the second measurement value and the quantized value of the first measurement value; determining, based at least in part on a differential measurement mapping indicating a set of differential value ranges, that the differential value is within a first differential value range of the set of differential value ranges; and determining the quantized differential value of the first measurement value as a middle value of the first differential value range.

Aspect 6: The method of any of aspects 1 through 5, further comprising: determining that the first measurement value is outside a range of a set of measurement value ranges comprised in a measurement mapping; and generating one or more additional measurement value ranges for the measurement mapping, wherein the first measurement value is within an additional measurement value range of the one or more additional measurement value ranges.

Aspect 7: The method of any of aspects 1 through 6, further comprising: receiving, via radio resource control signaling, the message indicating the one or more measurement parameters as part of a radio resource control configuration.

Aspect 8: The method of any of aspects 1 through 7, wherein the one or more measurement parameters comprise a measurement object indicating time and frequency resources associated with the set of reference signals, a measurement report configuration indicating one or more reporting parameters associated with generating the measurement report, a measurement identity that links the measurement object to the measurement report configuration, one or more layer 3 parameters, or any combination thereof.

Aspect 9: The method of any of aspects 1 through 8, wherein the first measurement value and the second measurement value are both RSRP values or both SINR values based at least in part on the one or more measurement parameters.

Aspect 10: The method of any of aspects 1 through 9, further comprising: receiving, a bit-value indicating a reporting option from a set of reporting options, wherein transmitting the measurement report indicating the quantized value of the first measurement value and indicating the quantized differential value is based at least in part on receiving the bit-value.

Aspect 11: A method for wireless communications, at a UE, comprising: receiving a first message indicating one or more measurement parameters associated with a set of reference signals; receiving a second message indicating one or more reporting parameters associated with a measurement report for the set of reference signals; receiving a first reference signal of the set of reference signals and a second reference signal of the set of reference signals, the first reference signal associated with a first measurement value, the second reference signal associated with a second measurement value, wherein the first measurement value and the second measurement value are based at least in part on the one or more measurement parameters; and transmitting the measurement report based at least in part on the one or more reporting parameters and in accordance with a reporting option selected from a set of reporting options for the measurement report, the set of reporting options comprising an absolute reporting option and a quantized reporting option, the measurement report indicating one or more measurements associated with the first reference signal and the second reference signal.

Aspect 12: The method of aspect 11, further comprising: receiving, as part of the first message, the second message, or both, a bit-value indicating the reporting option selected from the set of reporting options, wherein the reporting option is selected in accordance with the bit-value.

Aspect 13: The method of any of aspects 11 through 12, further comprising: transmitting, as part of the measurement report, a bit-value indicating the reporting option selected from a set of reporting options.

Aspect 14: The method of any of aspects 11 through 13, further comprising: determining, using the absolute reporting option, a first measurement associated with the first reference signal and the second reference signal, the first measurement having a first error; and determining, using the quantized reporting option, a second measurement associated with the first reference signal and the second reference signal, the second measurement having a second error, wherein the reporting option selected is based at least in part on which of the first error and the second error is lower.

Aspect 15: The method of any of aspects 11 through 14, wherein the absolute reporting option comprises: obtaining a differential value using a difference between the second measurement value and the first measurement value; determining, based at least in part on a differential measurement mapping indicating a set of differential value ranges, that the differential value is within a first differential value range of the set of differential value ranges; and determining a middle value of the first differential value range.

Aspect 16: The method of any of aspects 11 through 15, wherein the quantized reporting option comprises: determining, based at least in part on a measurement mapping indicating a set of measurement value ranges, that the first measurement value is within a first measurement value range of the set of measurement value ranges; determining a quantized value of the first measurement value as a middle value of the first measurement value range; measuring a differential value using a difference between the second measurement value and the quantized value of the first measurement value; determining, based at least in part on a differential measurement mapping indicating a set of differential value ranges, that the differential value is within a first differential value range of the set of differential value ranges; and determining a quantized differential value as a middle value of the first differential value range.

Aspect 17: A method for wireless communications, at a network entity, comprising: transmitting a first message indicating one or more measurement parameters associated with a set of reference signals; transmitting a second message indicating one or more reporting parameters associated with a measurement report for the set of reference signals; transmitting a third message indicating a reporting option from a set of reporting options to use for generating the measurement report; transmitting a first reference signal of the set of reference signals and a second reference signal of the set of reference signals; and receiving the measurement report based at least in part on the one or more reporting parameters and in accordance with the reporting option indicated in the third message, the measurement report indicating one or more measurements associated with the first reference signal and the second reference signal.

Aspect 18: The method of aspect 17, further comprising: transmitting, as part of the first message, the second message, or both, a bit-value indicating the reporting option from the set of reporting options.

Aspect 19: The method of any of aspects 17 through 18, further comprising: receiving, as part of the measurement report, a bit-value indicating the reporting option from the set of reporting options.

Aspect 20: The method of any of aspects 17 through 19, wherein the set of reporting options comprise an absolute reporting option and a quantized reporting option.

Aspect 21: An apparatus for wireless communications, comprising a processor; memory coupled with the processor; and instructions stored in the memory and executable by the processor to cause the apparatus to perform a method of any of aspects 1 through 10.

Aspect 22: An apparatus for wireless communications, comprising at least one means for performing a method of any of aspects 1 through 10.

Aspect 23: A non-transitory computer-readable medium storing code for wireless communications, the code comprising instructions executable by a processor to perform a method of any of aspects 1 through 10.

Aspect 24: An apparatus for wireless communications, comprising a processor; memory coupled with the processor; and instructions stored in the memory and executable by the processor to cause the apparatus to perform a method of any of aspects 11 through 16.

Aspect 25: An apparatus for wireless communications, comprising at least one means for performing a method of any of aspects 11 through 16.

Aspect 26: A non-transitory computer-readable medium storing code for wireless communications, the code comprising instructions executable by a processor to perform a method of any of aspects 11 through 16.

Aspect 27: An apparatus for wireless communications, comprising a processor; memory coupled with the processor; and instructions stored in the memory and executable by the processor to cause the apparatus to perform a method of any of aspects 17 through 20.

Aspect 28: An apparatus for wireless communications, comprising at least one means for performing a method of any of aspects 17 through 20.

Aspect 29: A non-transitory computer-readable medium storing code for wireless communications, the code comprising instructions executable by a processor to perform a method of any of aspects 17 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:

one or more processors;

memory coupled with the one or more processors; and instructions stored in the memory and executable by the one or more processors to cause the apparatus to:

receive a first message indicating one or more measurement parameters associated with a set of reference signals, the first message including a first bit-value indicating a first reporting option from a set of reporting options comprising an absolute reporting option and a quantized reporting option;

receive a second message indicating one or more reporting parameters for the set of reference signals, the second message including a second bit-value indicating a second reporting option from the set of reporting options;

receive a third message indicating which bit-value of the first bit-value and the second bit-value has a higher priority, the higher priority bit-value indicating which reporting option to use for generating a measurement report;

receive a first reference signal of the set of reference signals and a second reference signal of the set of reference signals, the first reference signal associated with a first measurement value, the second reference signal associated with a second measurement value, wherein the first measurement value and the second measurement value are based at least in part on the one or more measurement parameters; and transmit, based at least in part on receiving the third message indicating the higher priority bit-value, the measurement report indicating a quantized value of the first measurement value and indicating a quantized differential value corresponding to the second measurement value, wherein the quantized differential value corresponds to a difference between the second measurement value and the quantized value of the first measurement value.

2. The apparatus of claim 1, wherein the instructions are further executable by the one or more processors to cause the apparatus to:

receive, at a first frequency via a first cell, the first reference signal of the set of reference signals; and receive, at the first frequency via a second cell different from the first cell, the second reference signal of the set of reference signals.

3. The apparatus of claim 1, wherein the instructions are further executable by the one or more processors to cause the apparatus to:

receive, via a first cell at a first frequency, the first reference signal of the set of reference signals; and receive, via the first cell at a second frequency different than the first frequency, the second reference signal of the set of reference signals.

4. The apparatus of claim 1, wherein the instructions are further executable by the one or more processors to cause the apparatus to:

determine, based at least in part on a measurement mapping indicating a set of measurement value ranges, that the first measurement value is within a first measurement value range of the set of measurement value ranges; and determine the quantized value of the first measurement value as a middle value of the first measurement value range.

5. The apparatus of claim 1, wherein the instructions are further executable by the one or more processors to cause the apparatus to:

obtain a differential value based at least in part on the difference between the second measurement value and the quantized value of the first measurement value;

determine, based at least in part on a differential measurement mapping indicating a set of differential value ranges, that the differential value is within a first differential value range of the set of differential value ranges; and determine the quantized differential value of the first measurement value as a middle value of the first differential value range.

6. The apparatus of claim 1, wherein the instructions are further executable by the one or more processors to cause the apparatus to:

determine that the first measurement value is outside a range of a set of measurement value ranges comprised in a measurement mapping; and generate one or more additional measurement value ranges for the measurement mapping, wherein the first measurement value is within an additional measurement value range of the one or more additional measurement value ranges.

7. The apparatus of claim 1, wherein the instructions are further executable by the one or more processors to cause the apparatus to:

receive, via radio resource control signaling, the first message indicating the one or more measurement parameters as part of a radio resource control configuration.

8. The apparatus of claim 1, wherein the one or more measurement parameters and the one or more reporting parameters comprise a measurement object indicating time and frequency resources associated with the set of reference signals, a measurement report configuration indicating the one or more reporting parameters associated with the measurement report, a measurement identity that links the measurement object to the measurement report configuration, one or more layer 3 parameters, or any combination thereof.

9. The apparatus of claim 1, wherein the first measurement value and the second measurement value are both reference signal received power values or both signal to interference and noise ratio values based at least in part on the one or more measurement parameters.

10. An apparatus for wireless communications, comprising:

one or more processors;

memory coupled with the one or more processors; and instructions stored in the memory and executable by the one or more processors to cause the apparatus to:

transmit a first message indicating one or more measurement parameters associated with a set of reference signals, the first message including a first bit-value indicating a first reporting option from a set of reporting options comprising an absolute reporting option and a quantized reporting option;

transmit a second message indicating one or more reporting parameters associated with a measurement report for the set of reference signals, the second message including a second bit-value indicating a second reporting option from the set of reporting options;

transmit a third message indicating which bit-value of the first bit-value and the second bit-value has a higher priority, the higher priority bit-value indicating which reporting option to use for generating the measurement report;

transmit a first reference signal of the set of reference signals and a second reference signal of the set of reference signals; and receive the measurement report based at least in part on the one or more reporting parameters and in accordance with one of the first reporting option or the second reporting option indicated in the third message, the measurement report indicating one or more measurements associated with the first reference signal and the second reference signal, wherein, in accordance with the quantized reporting option, a quantized differential value corresponds to a difference between a quantized value of a first measurement value and a second measurement value, the first measurement value associated with the first reference signal and the second measurement value associated with the second reference signal.

11. The apparatus of claim 10, wherein the instructions are further executable by the one or more processors to cause the apparatus to:

receive, as part of the measurement report, a bit-value indicating one of the first reporting option or the second reporting option from the set of reporting options.

12. The apparatus of claim 10, wherein the quantized value is a middle value of a first measurement value range associated with the first measurement value.

* * * * *